United States Patent Office 3,547,912
Patented Dec. 15, 1970

3,547,912
DERIVATIVES OF 2H-PYRAN-3(6H)-ONES AND PREPARATION THEREOF
Yvon Lefebvre, Pierrefonds, Quebec, Canada, assignor to American Home Products Corporation, New York, N.Y., a corporation of Delaware
No Drawing. Filed July 29, 1968, Ser. No. 748,196
Int. Cl. C07c *173/00*
U.S. Cl. 260—239.55                                23 Claims

ABSTRACT OF THE DISCLOSURE

There are disclosed herein 3,24-dihydroxy-17β,24-epoxy - 19,21 - dinorchola - 1,3,5(10) - trien - 20 - one and its corresponding 1,3,5(10),22 - tetraen - 20 - one, 3,24 - dihydroxy - 17β,24 - epoxy - 19,21 - dinorchola-1,3,5,6,8(9) - pentaen - 20 - one and its corresponding 1,3,5,6,8(9),22 - hexaen - 20 - one, 7α,8-17β,24-diepoxy-3,24 - dihydroxy - 19,21 - dinorchola - 1,3,5(10) - trien-20-one and its corresponding 1,3,5(10),22-tetraen-20-one, and its corresponding 1,3,5(10),22-tetraen-20-one, and and their 3-ethers, 3-esters, 3,24-diethers, 3,24-diesters, as well as their 3-ethers-24-esters and 3-esters-24-ethers, and 3,17β - dihydroxy - 20 - oxo - 19,21 - dinorchola-1,3,5 (10)-trienoic acid δ-lactone and its corresponding 1,3,5 10,22 tetraenoic acid δ-lactone, 3,17β-dihydroxy-20-oxo-19,21-dinorchola-1,3,5,6,8(9)-pentaenoic acid δ-lactone and its corresponding 1,3,5,6,8(9),22-hexaenoic acid δ-lactone 3,17β-dihydroxy-7α,8-epoxy-20-oxo-19,21-dinorchola-1,3,5(10)-trienoic acid δ-lactone and its corresponding 1,3,5(10),22-tetraenoic acid δ-lactone and their 3-ethers and 3-esters, in which the ether-forming groups are lower alkyl groups containing from 1–4 carbon atoms, cycloalkyl groups, containing from 5–6 carbon atoms, or, in 3-position only, the tetrahydropyranyl group; and the ester-forming groups are acids containing from 2–7 carbon atoms. The compounds have anti-gonadotrophic and anti-progestational activities, and methods for their preparation and use are also disclosed.

The present invention relates to derivatives of 3-pyranones, to a process for preparing those compounds, and to intermediates used in their preparation.

The derivatives of 3-pyranones of this invention may be represented by the Formulae I or Ia

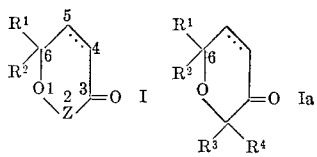

in which the dotted line represents an optional double bond; $R^1$ and $R^2$ together represent a ketonic oxygen, or $R^1$ represents hydrogen and $R^2$ represents the hydroxyl group, an aliphatic acyloxy group containing from 2–7 carbon atoms, or an alkoxy group containing from 1–4 carbon atoms or a cycloalkoxy group containing from 5–6 carbon atoms; and Z represents carbon atom 2 of the 2H-pyran-3(6H)-one ring, substituted with $R^3$ and $R^4$ so that the compounds of Formula I may also be represented by the Formula Ia shown above, with $R^3$ and $R^4$ each representing hydrogen; or $R^3$ representing hydrogen and $R^4$ representing an organic radical such as, for example, an alkyl group, a cycloalkyl group, an aryl or aralkyl group, all of which may also be substituted with substituents such as, for example, lower alkyl, lower alkoxy, halogen, trihalomethyl, or nitro groups; or $R^3$ and $R^4$ each representing the same or different organic radicals as defined above; or Z represents simultaneously both carbon atom 2 of the pyranone ring and a carbon atom of a carbocyclic ring system, in particular carbon atom 17 of a steroid nucleus of the estrane or the androstane series together with substituents attached thereto.

In addition, the organic radicals defined above may also contain isolated double bonds or conjugated double bonds apart from aromtaic double bonds which may be present.

A preferred embodiment of this invention relates to spiro compounds of Formula I in which Z represents simultaneously both carbon atom 2 of the pyranone ring and carbon atom 17 of a steroid nucleus of the estrane series. Those compounds may be represented by Formulae VIII, IX and X.

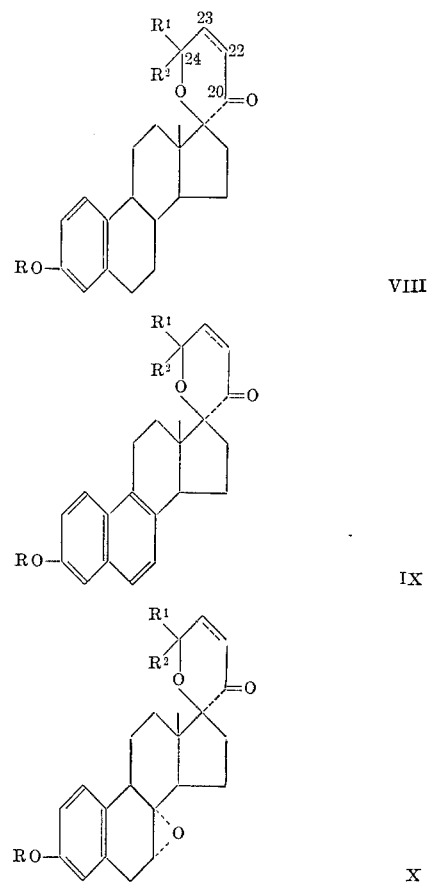

in which R represents hydrogen, an alkyl group containing from 1 to 4 carbon atoms, a cycloalkyl group containing from 5 to 6 carbon atoms, the tetrahydropyranyl group, or an acyl group containing from 2 to 7 carbon atoms, and $R^1$ and $R^2$ are as defined above. This preferred embodiment also relates to the process for preparing the above compounds, and to intermediates and starting materials used in their preparation.

Those compounds are more conveniently named as derivatives of 17β-hydroxy-19,21-dinorcholane than as derivatives of 2H-pyran-3(6H)-one, and it is preferred to use the former nomenclature throughout the further text. This entails re-numbering the carbon atoms of the pyranone ring as members of the 19,21-dinorcholane ring system, as shown above in Formula VIII.

The 17β-hydroxy-19,21-dinorcholane derivatives of the preferred embodiment of this invention possess antigonadotrophic and antiprogestational activities. More particularly, these derivatives exhibit utility as antigonadotrophic agents in standard pharmacological tests, for example, in the test described by C. Revesz and C. I. Chappel, J. Reprod. Fert., 12, 473 (1966).

In addition, these derivatives exhibit antiprogestational activity when tested by procedures designed to demonstrate this activity, for example, the procedure described by F. Newmann in "Methods in Drug Evaluation," P. Mantegazza and F. Piccinni, Editors, North-Holland Publishing Co., Amsterdam, 1966, page 548.

When the above 17β-hydroxy-19,21-dinorcholane derivatives are employed as antigonadotrophic or antiprogestational agents in warm-blooded animals, for example, rats, they may be administered orally, alone or in tablets combined with pharmacologically acceptable excipients, such as starch, milk sugar and so forth. They may also be administered orally in the form of solutions in suitable vehicles such as vegetable oils.

The dosage of these 17β-hydroxy-19,21-dinorcholane derivatives will vary with the particular compound chosen and form of administartion. Furthermore, it will vary with the particular host under treatment. Generally, the compounds of this invention are administered at a concentration level that affords the desired pharmacological effect without any deleterious side effects. These effective concentration levels are usually obtained with a therapeutic range of 0.1 to 50 mg. per kilo per day with a preferred range of 0.5–15 mg. per kilo per day.

Some of the compounds of this invention, in particular the compounds of Formula VIII, may be regarded as being somewhat related to known compounds. However, they differ from these known compounds in the following significant manner: The compounds of Formula VIII in which $R^1$ and $R^2$ together represent ketonic oxygen possess an additional keto group in position 20 which is not present in the known compounds; the compounds of Formula VIII in which $R^1$ represents hydrogen and $R^2$ represents the hydroxyl group or an esterified or etherified hydroxyl group have no known equivalents and are in no way related to known compounds.

The compounds of this invention are prepared by the following process. A furanmethanol of Formula III in which Z is as defined above is treated with an oxidizing agent such as, for example, an organic peracid or a hypohalous acid, or with an agent capable of furnishing the elements of a hypohalous acid in the presence of water, to yield the corresponding 6-hydroxy-2H-pyran-3(6H)-one derivative of Formula I in which the dotted line represents a double bond, $R^1$ represents hydrogen, $R^2$ represents the hydroxyl group, and Z is as defined above, as represented in greater detail by Formula IV.

The starting materials of Formula III may conveniently be prepared by treating a compound containing a reactive carbonyl function of the formula Z=O (II), in which Z is as defined above, with 2-furyllithium.

If desired, the 6-hydroxy-2-pyran-3(6H)-one derivatives of Formula IV obtained as described above may be further converted, as follows. Thus, oxidation of said last-named compounds of Formula IV, for example with hexavalent chromium ion, yields the corresponding 2H-pyran-3,6-diones of Formula I in which $R^1$ and $R^2$ together represent a ketonic oxygen, the dotted line represents a double bond, and Z is as defined above, as shown in greater detail by Formula V. Optional reduction of said last-named compounds of Formula V, for example with zinc in acetic acid, reduces the double bond and yields the corresponding compounds of Formula I in which $R^1$ and $R^2$ together represent a ketonic oxygen, the double bond is absent, and Z is as defined above. Those compounds may be named as derivatives of dihydro-2H-pyran-3,6-dione and are shown in greater detail in Formula VI.

Alternatively, the compounds of Formula VI may also be obtained by hydrogenation of the compounds of Formula IV to effect selective reduction of the double bond, thus obtaining the corresponding compounds of Formula I in which the double bond is absent, $R^1$ represents hydrogen, $R^2$ represents the hydroxyl group, and Z is as defined above. Those compounds may be named as derivatives of 6-hydroxy-dihydro-2H-pyran-3-one and are shown in greater detail in Formula VII. Said last-named compounds of Formula VII may in turn be oxidized, for example with hexavalent chromium ion, to yield the corresponding compounds of Formula VI.

In the above compounds of Formulae IV and VII the hydroxyl group may subsequently be esterified or etherified.

It will be apparent to those skilled in the art that certain limitations are imposed on the above process by the nature of substituents $R^3$ and $R^4$, and that it may be necessary to protect temporarily reactive groups present in those substituents by reaction with protective groups, and to remove such protective groups at a later stage. Such precautionary measures are described in the literature, for example in "Advances in Organic Chemistry," vol. 3, p. 191, New York and London 1963.

The following formulae in which Z is the significance defined above will illustrate the process of this invention in its most general form.

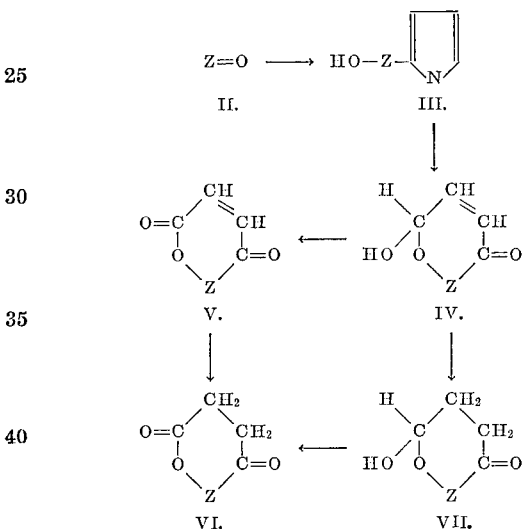

In the preferred embodiment of this invention, the starting materials are esterone, equilenin and 7α,8-epoxy-estrone and their corresponding 3-alkyl, 3-cycloalkyl or 3-tetrahydropyranyl ethers. The alkyl and cycloalkyl ethers are prepared according to the methods described by F. Glockling and D. Kingston, Chemistry and Industry, 1037 (1961) and the tetrahydropyranyl ethers are prepared according to the method of A. D. Cross et al., Steroids, 4, 423 (1964). 7α,8-epoxyestrone and its corresponding 3-ethers are readily prepared by treating equilin or the appropriate 3-ether of equilin, prepared by the methods of Glockling and Kingston or Cross et al., cited above, with a peracid preferably m-chloroperbenzoic acid in an inert solvent, preferably chloroform. Estrone, equilin and equilenin are well-known naturally occurring steroids; for example, see L. F. Fieser and M. Fieser, "Steroids," Reinhold Publishing Corporation, New York, 1959.

The starting materials described above are treated with 2-furyllithium in a mixture of ether-toluene at room temperature to yield the corresponding 17α-[2'-furyl]-17β-hydroxy steroids. During the course of this reaction, it is preferable to protect a free 3-hydroxy group if present; otherwise, a complex is formed between the hydroxy group and the 2-furyllithium, which wastes the furyllithium and adversely affects the yield of the product. Such temporary protection is readily afforded by a tetrahydropyranyl group which may be conveniently removed by subjecting the reaction product to hydrolysis under mildly acidic conditions, for example, dilute hydrochloric acid in methanol. Other suitable methods for protecting a free 3-hydroxyl group are described in "Advances in Organic Chemistry," cited above.

2-furyllithium is prepared by the action of n-butyllithium upon 2-bromofuran in ether at room temperature. Alternatively, 2-furyllithium is also obtained by the action of n-butyllithium upon furan in ether at room temperature. In turn, 2-bromofuran is obtained by decarboxylation of 5-bromo-2-furoic acid by the method of A. F. Shepard et al. (J. Am. Chem. Soc., 52, p. 2083 (1930).

The above $17\alpha$ - [2'-furyl]-$17\beta$-hydroxy steroids containing a free phenolic hydroxy group in position 3 prepared as described above, may be preferentially esterified at said position by conventional means with appropriate acid anhydrides or acid halides in pyridine at room temperature, to yield the corresponding 3-acyl derivatives. These 3-acyl derivatives are useful for preparing the corresponding 3-acyl $17\beta$-hydroxy-19,21-dinorcholane derivatives of this invention.

The above $17\alpha$-[2'-furyl]-$17\beta$-hydroxy steriods and their 3-acetates and 3-ethers are useful per se as powerful estrogens.

The above $17\alpha$-[2'-furyl]-$17\beta$-hydroxy steroids are treated with one to two molar equivalents of a hypohalous acid such as, hypobromous or hypochlorous acid or a reagent capable of furnishing the elements of a hypohalous acid upon contact with water. Preferred reagents for this reaction are certain N-haloimides or N-haloamides, such as, N-bromo- or N-chlorosuccinimide, or N-chloro- or N-bromoacetamide, used with or without small amounts of an acid, preferably perchloric acid; or the reaction may be carried out with an aqueous solution of an alkali metal salt of a hypohalite in contact with acid, such as, for example, sodium hypochlorite and acetic acid. Water must be present and preferred organic solvents include aliphatic and cyclic ethers, such as, for example, diethyl ether, dioxan or tetrahydrofuran; lower aliphatic ketones such as, for example, acetone or methyl ethyl ketone; aromatic hydrocarbons such as, for example, benzene, toluene, or xylene; lower aliphatic esters, such as, for example, the lower alkyl acetates, lower aliphatic carboxylic acids, such as, for example, acetic or butyric acid; lower aliphatic halogenated hydrocarbons such as, for example, chloroform, methylene chloride, or ethylene dichloride; and certain lower aliphatic alcohols such as, for example, methanol and t-butanol. The time of reaction may extend from three minutes to twenty-four hours, and reaction conditions are preferably chosen so as to complete the reaction within one-half hour. The temperature range at which the reactions may be carried out is from 0°–50° C., with temperatures of about 20–30° C. being the preferred range. It might be observed that when N-bromosuccinimide in aqueous methanol at room temperature is being used the oxidation is unusually rapid and is usually complete within five minutes.

Alternatively, the above $17\alpha$-[2'-furyl]-$17\beta$-hydroxy steroids are treated with an organic peracid, such as, for example, peracetic acid, perbenzoic acid, monoperphthalic acid, m-chloroperbenzoic acid, and p-nitroperbenzoic acid. The organic peracid utilized may range in amount from approximately 1.1 molar equivalent to 100 molar equivalents, per mole of steroid starting material. Any practical solvent inert to the peracid may be employed. Aliphatic and cyclic ethers, such as, for example, diethyl ether, dioxan, or tetrahydrofuran; lower aliphatic ketones such as, for example, acetone or methyl ethyl ketone; aromatic hydrocarbons such as, for example, benzene, toluene, or xylene; lower aliphatic alcohols, such as, for example, methanol, ethanol, isopropanol, or t-butanol; lower aliphatic acids and their lower alkyl esters such as, for example, acetic acid, ethyl acetate, or butyl acetate; and halogenated hydrocarbons such as, for example, chloroform, methylene chloride, carbon tetachloride, or ethylene dichloride, are all useful inert solvents. The time of reaction may extend from 15 minutes to 60 hours, with the preferred range being from one-half to twenty-four hours.

In this manner, when starting with the $17\alpha$-[2'-furyl]-$17\beta$-hydroxy derivatives of estrone, equilenin, or $7\alpha$,8-epoxy estrone, the corresponding $17\beta$-hydroxy-19,21-dinorcholane derivatives of Formulae VIII, IX, and X in which R is as defined above, $R^1$ represents hydrogen, $R^2$ represents the hydroxyl group, and the dotted line represents a double bond, are respectively obtained.

In a variant of the above procedure equilin, its corresponding 3-alkyl or 3-cycloalkyl ethers, or its 3-tetrahydropyranyl ether, described above, are treated with 2-furyllithium in the same manner as described above to yield the corresponding $17\alpha$-[2'-furyl]-$17\beta$-hydroxy derivatives. As noted above, it is desirable to protect a free 3-hydroxy group, if present, with a temporary protecting group such as a tetrahydropyranyl ether during the course of this reaction. Such protective groups may subsequently be removed and be replaced by 3-acyl groups in a conventional manner. Subsequent treatment of the $17\alpha$ - [2'-furyl]-$17\beta$-hydroxy derivatives of equilin with two equivalents or more of an organic peracid under the conditions described above, affords the compounds of Formula X in which R is as defined above, $R^1$ represents hydrogen, $R^2$ represents the hydroxyl group, and the dotted line represents a double bond, by simultaneous epoxidation of the 7,8-double bond and oxidation of the $17\alpha$-furyl ring.

The compounds of Formulae VIII, IX, and X in which R, $R^1$, and $R^2$ are as defined above may conveniently be referred to as derivatives of $17\beta$,24-epoxy-19,21-dinorcholane. They are obtained as a mixture of steroisomeric alcohols due to the introduction of an asymmetric center at position 24. These stereoisomers may be separated by standard chemical procedures, such as crystallization or the mixture of stereoisomers may be utilized for the preparation of other $17\beta$-hydroxy-19,21-dinorcholane derivatives within the scope of this invention. The individual stereoisomers are designated as isomer A and isomer B for convenience. The designation of isomer A, is arbitrarily given to the major stereoisomer which usually constitutes 60–80% of the reaction product.

Treatment of the above $17\beta$,24-epoxy-19,21-dinorcholane derivatives of Formulae VII, IX, and X in which the dotted line represents a double bond, R is as defined above, $R^1$ is hydrogen, and $R^2$ is the hydroxyl group with an appopriate acid anhydride or acid halide in pyridine affords the corresponding 24-acylated derivatives. If a free phenolic 3-hydroxy group is present it also will be acylated during the course of this reaction. On the other hand, if it is preferred to retain the free phenolic 3-hydroxy group the $17\beta$,21-epoxy-19,21-dinorcholane derivatives referred to above may be treated with a mixture of the appropriate acid and acid anhydride or acid halide, for example, acetic acid-acetic anhydride (4:1), to yield the corresponding 3-hydroxy-24-acylated derivatives.

If mixtures of stereoisomers of the above $17\beta$,24-epoxy-19,21-dinorcholane derivatives have been used for the preparation of the 24-acylated derivatives described above, then the acylated derivatives are obtained as mixtures of stereoisomers.

The mixture of 24-acylated stereoisomers may be separated by conventional chemical means, such as, crystallization, and are arbitrarily designated as isomer A (the major isomer) and isomer B (the minor isomer) for convenience.

Treatment of the above $17\beta$,24-epoxy-19,21-dinorcholane derivatives of Formulae VIII, IX, and X in which the dotted line represents a double bond, R is defined above, $R^1$ is hydrogen and $R^2$ is the hydroxyl group, with an appropriate alkyl alcohol in the presence of an acid catalyst, such as, for example, perchloric acid, affords the corresponding 24-ethers.

The individual or mixture of stereoisomers of $17\beta$,24- epoxy-19,21-dinorcholane derivatives of Formulae VIII, IX, and X in which the dotted line represents a double bond, R is as defined above, $R^1$ is hydrogen and $R^2$ is the hydroxy group, are readily oxidized by means of hexavalent chromium ion to the corresponding keto-lactones of Formulae VIII, IX, and X in which $R^1$ and $R^2$ together represent a ketonic oxygen. Chromic acid in the presence of sulfuric acid and water, a modification described by A. Bowers et al., J. Chem. Soc., 2548 (1953) is a preferred reagent for this oxidation. During the courses of this reaction, if a tetrahydropyranyl group is present at the 3-position of the starting material, said group will be cleaved to the 3-hydroxy group; the 3-tetrahydropyranyl ether may be reformed by subjecting the reaction product to the conditions described by Cross, cited above.

The keto-lactones obtained as described above may be reduced in the presence of zinc and acetic acid to yield the corresponding keto-lactones of Formulae VIII, IX, and X in which the bond in position 22,23 is saturated, R is as defined above and $R^1$ and $R^2$ together represent a ketonic oxygen.

The individual or mixture of stereoisomers of the 17β, 24-epoxy-19,21-dinorcholane derivatives of Formulae VIII, IX, and X in which the dotted line represents a double bond, R is as defined above, $R^1$ represent hydrogen, and $R^2$ represents the hydroxyl group may be reduced by hydrogenation in the presence of a noble metal catalyst, such as, for example palladium, to yield the correspondingly substituted compounds of Formulae VIII, IX, and X in which the bond is position 22,23 is saturated.

If the above compounds possess a free hydroxyl group in position 24, they mal be acylated or etherified in the manner as described above.

Finally, the individual or mixture of stereoisomers of the 17β,24 - epoxy - 19,21-dinorcholane derivatives of Formulae VIII, IX, and X in which the bond at position 22,23 is saturated, R is as defined above, $R^1$ is hydrogen, and $R^2$ represents the hydroxy group are useful for an alternative preparation of the corresponding keto lactones. As such, these norcholane derivatives are oxidized in the same manner as described above to yield the said keto lactones of Formulae VIII, IX, and X in which the bond in position 22,23 is saturated, R is as defined above and $R^1$ and $R^2$ together represent a ketonic oxygen. These compounds are identical with the same compounds described above.

The following examples will illustrate this invention.

EXAMPLE 1

The 3-ethers of estrone, equilin and equilenin are prepared by the method of Glockling and Kingston, described in Chem. and Ind. 1037 (1961) by the action of the corresponding alkyl halides on the potassium or sodium salts of the phenol. Accordingly the 3-methyl, 3-ethyl, 3-propyl, 3-isopropyl, 3-n-butyl, 3-sec.-butyl, 3-cyclopentyl and 3-cyclohexyl ethers of estrone, equilin and equilenin are obtained.

The tetrahydropyranyl ethers of estrone, equilin and equilenin are prepared according to the method described by A. D. Cross et al., in Steroids. vol. 4, p. 423 (1964).

EXAMPLE 2

A solution of 2-bromofuran (2.32 g.) in dry ether (46 ml.) is cooled to 0° C. An ethereal solution of n-butyllithium 1.35 N (11 ml.) is added. The mixture is allowed to reach room temperature and is stirred at room temperature for 30 minutes. A solution of estrone 3-methyl ether (2.32 g) in dry toluene (92 ml.) is added and the reaction mixture is stirred at room temperature for 60 hours. Water is added; the organic solvents are washed with water to neutrality, dried and evaporated yielding a yellow gum. The latter product is purified by chromatography on alumina. The fractions eluted with benzene-hexane 1:1 are combined and crystallized several times from hexane to yield the 3-methyl ether of 17α-[2' - furyl]-1,3,5(10)-estratriene-3,17-diol, M.P. 117–119°.

Alternatively a solution of furan (50 g.), dry ether (1000 ml.) and a 1.53 N etheral solution of butyllithium (548 ml) is stirred at room temperature for 1 hour. Then a solution of estrone 3-methyl ether (50 g.) in dry toluene (2000 ml.) is added and the mixture is stirred overnight at room temperature. The reaction is worked as above and the residue is chromatographed on basic alumina. The fractions eluted with mixtures of benzene-hexane and benzene are combined and crystallized from benzene-hexane yielding the 3-methyl ether of 17α-[2'-furyl]-1, 3,5(10)-estratriene-3,17-diol, M.P. 124–125°.

In the same manner as described above, the 3-ethyl, 3-propyl, 3-isopropyl, 3-butyl, 3-sec.-butyl, 3-cyclopentyl and 3-cyclohexyl ethers of estrone, prepared in Example 1, yield when treated with 2-furyllithium the 3-ethyl, 3-propyl, 3-isopropyl, 3-n-butyl. 3-sec.-butyl, 3-cyclopentyl and 3-cyclohexyl ethers of 17α-[2'-furyl]-1,3,5(10)-estratriene-3,17-diol.

A solution of furan (10 g.) in ether (200 ml.) and a 1.76 N ethereal solution of n-butyllithium (86 ml.) is stirred for one hour at room temperature. Then a solution of equilin 3-methyl ether (10 g.) in toluene (400 ml.) is added and the mixture is stirred for 16 hours at room temperature. Water is added. The organic layer is further washed with water, dried and evaporated to dryness. The residue is chromatographed on basic alumina. The fractions, eluted with benzene-hexane 1:2, are combined, yielding the 3-mehtyl ether of 17α-[2'-furyl]-1,3,5,(10), 7-esteratetraene-3,17-diol, M.P. 116–118.

In the same manner, the 3-ethyl, 3-propyl, 3-isopropyl, 3-n-butyl, 3-sec.-butyl, 3-cyclopentyl and 3-cyclohexyl ethers of equilin, described in Example 1 yield respectively the 3-ethyl, 3-propyl, 3-isopropyl, 3-n-butyl, 3-sec.-butyl, 3-cyclopentyl and 3-cyclohexyl ethers of 17α-[2'-furyl]-1,3,5(10)-estratetraene-3,17-diol.

Similarly the 3-methyl, 3-ethyl, 3-propyl, 3-isopropyl, 3-n-butyl, 3-sec.-butyl, 3-cyclopentyl and 3-cyclohexyl ethers of equilenin, described in Example 1, yield the 3-methyl, 3-ethyl, 3-propyl, 3-isopropyl, 3-n-butyl, 3-sec.-butyl, 3-cyclopentyl and 3-cyclohexyl ethers of 17α-[2'-furyl]-1,3,5(10)-estratetraene-3,17-diol.

EXAMPLE 4

A solution of furan (17.8 g.), dry ether (356 ml.) and an ethereal solution of n-butyllithium 1.49 N (168 ml.) is stirred at room temperature for one hour. A solution of estrone 3-tetrahydropyranyl ether (17.8 g.) in toluene (700 ml.) is added and the reaction mixture is stirred at room temperature for 16 hours. The product is isolated as indicated in Example 2 to yield the 3-tetrahydropyranyl ether of 17α-[2'-furyl]-1,3,5(10)-estratriene-3,17-diol.

In a similar manner the 3-tetrahydropyranyl ethers of equilin and equilenin are treated with 2-furyllithium to give the corresponding 3-tetrahydropyranyl ethers of 17α-[2'-furyl] - 1,3,5(10)7 - estratetraene - 3,17-diol and 17α-[2'-furyl]-1,3,5,6,8(9)-estrapentaene-3-17-diol.

EXAMPLE 5

A solution of the 3-tetrahydropyranyl ether of 17α-[2'-furyl]-1,3,5(10)-estratriene-3-17-diol, described in Example 4 (21.3 g.), methanol (850 ml.) and a 0.1 N solution of hydrochloric acid (213 ml.) is stirred at room temperature for one hour. Water (850 ml.) is added and the mixture is stirred for 2 hours. The resulting solid is filtered, washed with water and dried. Crystallization from ether-hexane yields 17α[2'-furyl]-1,5,5(10)-estratriene-3,17-diol M.P. 153–155°.

In a similar manner the 3-tetrahydropyranyl ethers of 17α - [2'-furyl] - 1,3,5(10)7 - estratetraene-3,17-diol and 17α - [2'-furyl] - 1,3,5,6,8(9) - estrapentaene-3,17-diol are hydrolyzed with dilute hydrochloric acid in methanol yielding respectively 17α-[2'-furyl]-1,3,5(10)7-estratetraene-3,17-diol and 17α-[2'-furyl] - 1,3,5,6,8(9) - estrapentaene-3,17-diol.

EXAMPLE 6

A solution of 17α - [2'-furyl]-1,3,5(10)-estratriene-3,17-diol (375 mg.) prepared in Example 5, pyridine (3.75 ml.) and acetic anhydride (3.75 ml.) is stirred for 16 hours at room temperature. The mixture is poured in ice water and is extracted with ether. The ether is washed with dilute sulfuric acid, bicarbonate and water. After drying and evaporating the solvent to dryness, the 3-acetate of 17α - [2'-furyl] - 1,3,5(10)-estratriene-3,17-diol is obtained.

In a similar manner acetylation of 17α-[2'-furyl]-1,3,5(10),7-estratetraene-3,17-diol and 17α - [2'-furyl] - 1,3,5,6,8(9)-estrapentaene-3,17-diol yields the corresponding 3-acetates of 17α - [2'-furyl] - 1,3,5(10,7 - estratetraene-3,17-diol and 17a - [2'-furyl-1,3,5,6,8(9)-estrapentaene-3,17-diol.

Similarly acylation of 17α - [2'-furyl]-1,3,5(10)-estratriene-3,17-diol, 17α - [2'-fuyrl] - 1,3,5(10)7-estratetraene-3,17-diol and 17α - [2'-furyl] - 1,3,5,6,8(9)-estrapentaene-3,17-diol with the appropriate acid anhydrides or acid halides yields the corresponding 3-acylates such as the 3-propanoates, 3-butanoates, 3-pentanoates, 3-hexanoates and 3-heptanoates of 17α-[2'-furyl]11,3,5(10)-estratriene-3,17-diol, 17α - [2'-furyl] - 1,3,5(10),7-estratetraene-3,17-diol and 17α - [2'-furyl]-1,3,5,6,8(9)-estrapentaene-3,17-diol, respectively.

EXAMPLE 7 m-Chloroperbenzoic acid (4.05 g.) is added by portions, over a period of 30 minutes to a stirred, ice-cold, solution of equilin 3-methyl ether (5 g.) in chloroform (125 ml.). The mixture is stirred for an additional 2 hours in the ice-bath and then for 30 minutes at room temperature. The solution is washed with a 5% sodium carbonate solution and with water, dried and evaporated. The colour is removed from the crude crystalline product by filtration on a column of alumina. The fractions eluted with 1:1 benzene petrolamether are combined and crystallized from methanol to yield the 3-methyl ether of 7α,8-epoxyestrone M.P. 176–178° C.

By a similar procedure the 3-ethyl, 3-propyl, 3-isopropyl, 3-n-butyl, 3-sec.-butyl, 3-cyclopentyl and 3-cyclohexyl ethers of equilin are oxidized to the corresponding 7α,8-epoxy derivatives with m-chloroperbenzoic acid in chloroform solutions. In this manner, there are obtained the 3-ethyl, 3-propyl, 3-isopropyl, 3-n-butyl, 3-sec.-butyl, 3-cyclopentyl and 3-cyclohexyl ethers of 7a,8-exopy-estrone.

EXAMPLE 8 m-Chloroperbenzoic acid (25.8 g.) is added by portions to a stirred, ice-cold suspension of equilin (25.0 g.), in chloroform (500 ml.). After 3 hours, the solution is washed four times with a 5% sodium carbonate solution and with water, dried and evaporated.

The dark red oil, dissolved in benzene (750 ml.), is stirred under nitrogen for 3 hours with dihydropyran (30 ml.), and p-toluenesulfonic acid (500 g.). Pyridine (0.5 ml.), is added and the solution is washed with water, dried and evaporated. The crude product is chomatographed on Florisil. Elution with mixtures of benzene and ether yields the 3-tetrahydropyranyl ether of 7a,8-epoxyestrone.

EXAMPLE 9

A solution of furan (4.1 g.), ether (82 ml.), and a 1.52 N ethereal solution of n-butyllithium (37.2 ml.), is stirred at room temperature for one hour. Then a solution of the 3-methyl ether of 7α,8-epoxyestrone (4.1 g.), obtained in Example 7, in toluene (164 ml.), is added and the mixture is stirred at room temperature for 16 hours. Ether and water are added. The organic phase is further washed with water, dried and evaporated to dryness, leaving a solid which up srystallization from methylene chloride ether yields the 3-methyl ester of 7α,8-epoxy-17α-[2'-furyl]-1,3,5(10)-estratriene-3,17-diol M.P. 188–190°.

Similarly the 3-ethyl, 3-propyl, 3-isopropyl, 3-m-butyl, 3-sec.-butyl, 3-cyclopentyl, 3-cyclohexyl and 3-tetrahydropyranyl ethers of 7a,8-epoxyestrone are transformed when treated with 2-furyl-lithium to the 3-ethyl, 3-propyl, 3-isopropyl, 3-n-butyl, 3-sec.-butyl, 3-cyclopentyl-3-cyclohexyl and 3-tetrahydropyranyl ethers of 7a,8-epoxy-17α-[2'-furyl]-1,3,5(10)-estratriene-3,17-diol.

EXAMPLE 10

By a similar method to the one described in Example 5, the 3-tetrahydropyranyl ether of 7α,8 - epoxy - 17α - [2'-furyl]-1,3,5(10-estratriene-3,17-diol prepared in Example 9, is hydrolyzed with dilute hydrochloric acid in methanol yielding 7α,8 - epoxy-17α-[2'-furyl]-1,3,5(10)-estratriene-3,17-diol.

EXAMPLE 11

Acylation by the method of Example 6 of 7α,8-epoxy-17α-[2'-furyl]-1,3,5(10)estratriene-2,17-diol, prepared in Example 10, yields the corresponding 3-acylates such as for example the 3-acetate, 3-propanoate, 3-butanoate, 3-pentanoate, 3-hexanoate and 3-heptanoate of 17α,8-epoxy-17α-[2'-furyl]-1,3,5(10)-estratriene-3,17-diol.

EXAMPLE 12

A mixture of the 3-methyl ether of 17α-[2'-furyl]-1,3,5,(10)-estratriene-3,17-diol (3.2 g.), described in Example 2, a 48% (M/V) solution of peracetic acid (3.2 ml.), sodium acetate (3.2 g.) and chloroform (32 ml.) is stirred at room temperature for 3 hours. The organic solution is washed with water and with a 50% solution of potassium iodide, until no iodine is formed. The solution is further washed with a solution of sodium thiosulfate and then water, dried and evaporated. The residue is crystallized from nitro methane to yield the 3-methyl ether of 3,24-dihydroxy - 17β,24 - epoxy - 19,21 - dinorchola - 1,3,5 (10),22-tetraen-20-one as a mixture of isomers A and B M.P. 191–192° C.

Alternatively m-chloroperbenzoic acid (2.45 g.) is added to a solution of the 3-methyl ether of 17α-[2'-furyl]-1,3,5(10)-estratriene-3,17-diol (2 g.) in chloroform (20- ml.). The mixture is stirred for 30 minutes at room temperature. Ether is added and the solution is washed with sodium carbonate and water, dried and evaporated to dryness, yielding the 3-methyl ether of 3,24-dihydroxy-17β,24 - epoxy-19,21 - dinorchola-1,3,5(10),22 - tetraen-20-one as a mixture of isomers A and B.

Similarly oxidation as above, of the 3-methyl ether of 17α-[2'-furyl]-1,3,5(10)-estratriene-3,17-diol with m-chloroperbenzoic acid but replacing chloroform with acetone, ether, dioxan, tetrahydrofuran, methanol, benzene, ethyl acetate and acetic acid and for periods of time ranging from 30 minutes to 20 hours affords the 3-methyl ether of 3,24 - dihydroxy - 17β,24 - epoxy - 19,21 - dinorchola - 1,3,5(10),22-tetraen-20-one as a mixture of isomers A and B.

Again alternatively a mixture of the 3-methyl ether of 17α-[2'-furyl]-1,3,5(10)-estratriene - 3,17 - diol (1 g.), chloroform (50 ml.) and p-nitroperbenzoic acid (640 mg.) is stirred at room temperature for one hour. The solid is filtered and the filtrate is washed with sodium bicarbonate and water. After drying and evaporating the solvent, there is obtained a mixture of isomers A and B of the 3-methyl ether of 3,24-dihydroxy-17β,24-epoxy-19,21-dinorchola-1,3,5(10),22-tetraen-20-one.

EXAMPLE 13

N-bromosuccinimide (1.08 g.) is added by portions to a suspension of the 3-methyl ether of 17α-[2₂-furyl]-1,3,5 (10)-estratriene-3,17-diol (2.16 g.) prepared in Example 2, in methanol (216 ml.) and water (21 ml.) The mixture is stirred for five minutes. Water is added; the mixture is extracted with ether and the ether solution is washed with water, dried and evaporated. The residue is chromatographed on silica gel and the fractions eluted with mixtures of ether and benzene 1:19 and 1:9 are combined and crystallized from methylene chloride-ether to yield the 3-methyl ether of 3,24-dihydroxy-17β,24-epoxy-19,21-dinorchola-1,3,5(10),22-tetraen-20-one M.P. 180–184° as a mixture of isomers A and B.

In a similar manner, but replacing methanol by acetone dioxan, ether, tetrahydrofuran, benzene, ethyl acetate or acetic acid, the 3-methyl ether of 17α-[2'-furyl]-1,3,5,(10)-estratriene-3,17-diol is oxidized with N-bromosuccinimide in presence of water for approximately 30 minutes at room temperature to afford the 3-methyl ether of 3,24 - dihydroxy - 17β,24 - epoxy - 19,21 - dinorchola - 1,3,5(10),22-tetraen-20-one, as mixtures of isomers A and B.

EXAMPLE 14

A mixture of the 3-tetrahydropyranyl ether of 17α-[2'-furyl]-1,3,5(10)-estratrieine-3,17-diol (114 g.), obtained in Example 4, chloroform (1140 ml.), sodium acetate (114 g.) and 40% solution of peracetic acid (114 ml.) is stirred at room temperature for 3½ hours. The solution is washed with water and sodium bicarbonate, dried and evaporated to dryness. The residue is crystallized from methanol (containing a trace of pyridine) to yield the 3-tetrahydropyranyl ether of 3,24-dihydroxy-17β,24-epoxy-19,21-dinorchola-1,3,5(10),22-tetraen-20-one as a mixture of isomers A and B.

In a similar manner the 3-tetrahydropyranyl ethers of 17α - [2' - furyl] - 1,3,5,6,8(9) - estrapentaene - 3,17-diol, obtained in Example 5 and 7α,8 - epoxy - 17α - [2'-furyl]-1,3,5(10)-estratriene-3,17-diol, obtained in Example 9 are oxidized to yield the 3-tetra-hydropyranyl ethers of 3,24 - dihydroxy - 17β,24 - epoxy - 19,21 - dinorchola-1,3,5,6,8(9),22-hexaene-20-one and 7α,8-17β,24-diepoxy-3,24 - dihydroxy - 19,21 - dinorchola - 1,3,5(10)-22-tetraene-20-one respectively as mixtures of isomers A and B.

EXAMPLE 15

A mixture of the 3-tetrahydropyranyl ether of 3,24-hydroxy-17β,24 - epoxy-19,21 - dinorchola - 1,3,5(10), 22-tetraen-20-one (mixtures of isomers A and B (35 g.), obtained in Example 14, methanol (1400 ml.) and a 0.1 N solution of hydrochloric acid (350 ml.) is stirred at room temperature for 2 hours. The methanol is evaporated under reduced pressure and the resulting solid is filtered yielding a mixture of isomers A and B of 3,24-dihydroxy-17β,24 - epoxy - 19,21 - dinorchola - 1,3, 5(10),22-tetraen-20-one M.P. 234–235° (dec.).

In a similar manner the 3-tetrahydropyranyl ethers of 3,24 - dihydroxy - 17β,24 - epoxy - 19,21 - dinorchola - 1,3,5,6,8(9),22-hexaen-20-one and 7α,8-17β,24-diepoxy-3,24 - dihydroxy - 19,21 - dinorchola - 1,3,5(10),22 - tetraen-20-one, obtained in Example 14, are hydrolyzed with mild acid to yield mixtures of isomers A and B of 3,24 - dihydroxy - 17β,24 - epoxy - 19,21 - dinorchola-1,3,5,6,8(9),22 - hexaen - 20 - one and 7α,8 - 17β,24-diepoxy - 3,24 - dihydroxy - 19,21 - dinorchola - 3,5(10), 22-tetraen-20-one, respectively.

EXAMPLE 16

To a solution of the 3-cyclopentyl ether of 17α-[2'-furyl]-1,3,5(10)-estratriene-3,17-diol (55 g.), prepared in Example 2, in chloroform (700 ml.) is added over a period of 15 minutes a solution of m-chloroperbenzoic acid (40.0 g.) in chloroform (50 ml.). The solution is stirred at room temperature for 2 hours. The solution is washed with sodium bicarbonate, water and dried and evaporated. The residue is chromatographed on silica gel. The fractions eluted with benzene-ethyl acetate (19.5:0.5) are combined and crystallized from acetone-hexane yielding the 3-cyclopentyl ether of 3,24-dihydroxy-17β,24-epoxy - 19,21 - dinorchola - 1,3,5(10),22 - tetraen - 20 - one, as a mixture of isomers A and B, M.P. 173–174°.

Similarly, oxidation of the 3-ethyl, 3-propyl, 3-isopropyl, 3-n-butyl, 3-sec.-butyl, 3-cyclohexyl ethers of 17α-[2'-furyl]-1,3,5(10)-estratriene-3,17-diol, described in Example 2, affords the 3-ethyl, 3-propyl, 3-isopropyl, 3-n-butyl, 3-sec.-butyl and 3-cyclohexyl ethers of 3,24-dihydroxy - 17β,24 - epoxy - 19,21 - dinorchola - 1,3,5(10), 22-tetraen-20-one as mixtures of isomers A and B.

Similarly, the 3-methyl, 3-ethyl, 3-propyl, 3-isopropyl, 3-n-butyl, 3-sec.-butyl-3-cyclohexyl and 3-cyclopentyl ethers of 17α-[2'-furyl] - 1,3,5,6,8(9) - estrapentaene-17-diol, prepared in Example 3 are oxidized to yield the 3-methyl, 3-ethyl, 3-propyl, 3-isopropyl, 3-n-butyl, 3-sec.-butyl, 3-cyclopentyl and 3-cyclohexyl ethers of 3,24-dihydroxy - 17β,24 - epoxy - 19,21 - dinorchola - 1,3,5,6,8(9), 22-hexaen-20-one. All these compounds are obtained as mixtures of isomers A and B.

EXAMPLE 17

A mixture of the 3-methyl ether of 7α,8-epoxy-17α-[2'-furyl]-1,3,5(10)-estratriene-3,17-diol (53.5 g.), prepared in Example 9, chloroform (53.5 ml.), sodium acetate (53.5 g.) and a 40% solution of peracetic acid (53.5 ml.) is stirred at room temperature for 6½ hours. The solution is washed with water and then with a 50% solution of potassium iodide until no iodine is developed. The solution is further washed with sodium thiosulfate and water, dried and evaporated. The residue is chromatographed on silica gel. The fractions eluted with mixtures of benzene-ethyl acetate 9:1 and 4:1 are combined to yield the 3-methyl ether of 7α,8-17β,24-diepoxy-3,24-dihydroxy-19,21-dinorchola-1,3,5(10), 22-tetraen-20-one as mixture of isomers A and B. The pure isomer A is obtained by crystallizing the mixture with acetone-hexane M.P. 183–184°.

In a similar manner the 3-ethyl, 3-propyl, 3-isopropyl, 3-n-butyl, 3-sec.-butyl, 3-cyclopentyl and 3-cyclohexyl ethers of 7α,8-epoxy-17α-[furyl]-1,3,5(10)-estratriene-3, 17-diol, described in Example 9, are oxidized to yield the 3-ethyl, 3-propyl, 3-isopropyl, 3-n-butyl, 3-sec.-butyl, 3-cyclopentyl, 3-cyclohexyl ethers of 7α,8-17β,24-diepoxy-3,24-dihydroxy-19.21-dinorchlola-1,3,5(10),22-tetraen-20-one. These compound are all obtained as mixtures of isomers A and B.

EXAMPLE 18

A mixture of the 3-methyl ether of 17α-[2'-furyl]-1,3, 5(10),7-tetraene-3,17-diol (1.65 g.) obtained in Example 3, chloroform (33 ml.), sodium acetate (1.65 g.) and a 40% solution of peracetic aicd (3.3 ml.) is stirred at room temperature for five hours, while keeping the temperature between 0 and 5°. The reaction is worked up as previously and the crude residue is crystallized from acetone-hexane yielding the 3-methyl ether of 7α,8-17β,24-diepoxy-3,24-dihydroxy-19,21-diniorchola - 1,3,5(10),22-tetraen-20-one M.P. 180–181° C., as a mixture of isomers A and B.

In a similar manner oxidation of the 3-ethyl, 3-propyl, 3-isopropyl, 3-n-butyl, 3-sec.-butyl, 3-cyclopentyl, 3-cyclohexyl ethers of 17α-[2'-furyl]1,3,5(10),7-estratetraene-3,17-diol, obtained in Example 3, affords the 3-ethyl, 3-propyl, 3-isopropyl, 3-n-butyl, 3-sec.-butyl, 3-cyclopentyl, 3-cyclohexyl ethers of 7α,8-17β,24-diepoxy-3,24-dihydroxy-19,21-dinorchola-1,3,5(10),22-tetraen-20-one. All these compounds are obtained as mixtures of isomers A and B.

By a similar procedure 17α-[2'-furyl]-1,3,5(10),7-estratetraene-3,17-diol and its 3-tetrahydropyranyl ether, respectively prepared in Examples 4 and 5 are oxidized to yield 7α,8-17β,24 - diepoxy-3,24-dihydroxy-19,21-dinorchola-1,3,5(10),22-tetraen-20-one and its 3-tetrahydropyranyl ether, respectively, as mixtures of isomers A and B.

Similarly oxidation of the 3-acetate, 3-propanoate, 3-butanoate, 3-pentanoate, 3-hexanoate and 3-heptanoate of 17α-[2′-furyl]-1,3,5(10),7 - estratetraene-3,17-diol yields the 3-acetate, 3-propanoate, 3-butanoate, 3-pentanoate, 3-hexanoate and 3-heptanoate of 7α,8–17β,24-diepoxy-3,24-dihydroxy-19,21-dinorchola - 1,3,5(10),22-tetraen-20-one, as mixtures of isomers A and B.

EXAMPLE 19

By the procedure described in Example 12, 17α-[2′-furyl]-1,3,5(10)-estratriene-3,17-diol, 17α-[2′-furyl]-1,3,-5,6,8(9)-estrapentaene-3,17-diol and 7α,8-epoxy-17α-[2′-furyl]-1,3,5(10)-estratriene - 3,17 - diol, respectively described in Examples 5 and 10 are oxidized to give mixtures of isomers A and B of 3,24-dihydroxy-17β,24-epoxy-19,21-dinorchola-1,3,5(10),22-tetraen-20-one, 3,24 - dihydroxy-17β,24-epoxy-19,21 - dinorchola - 1,3,5,6,8(9),22-hexaen-20-one and 7α,8-17β,24-diepoxy-3,24-dihydroxy-19,21-dinorchola-n,3,5(10),22-tetraen-20-one.

Similarly the 3-acetates, 3-propanoates, 3-butanoates, 3-pentanoates, 3-hexanoates and 3-heptanoates of 17α-[2′-furyl]-1,3,5(10)-estratriene-3,17-diol, 17α-[2′-furyl]-1,3,5,6,8(9)-estrapentaene-3,17-diol and 7α,8 - epoxy-17α-[2′-furyl]-1,3,5(10)-estratriene - 3,17 - diol respectively described in Examples 6 and 11, are transformed by oxidation to the 3-acetates, 3-propanoates, 3-butanoates, 3-pentanoates, 3-hexanoates and 3-heptanoates of 3,24-dihydroxy-17β,24-epoxy - 19,21 - dinorchola-1,3,5(10),22-tetraen-20-one, 3,24-dihydroxy-17β,24-epoxy-19,21-dinorchola-1,3,5,6,8(9),22-hexaen-20-one and 7α,8-17β,24-diepoxy-3,24-dihydroxy - 19,21-dinorchola - 1,3,5(10),22-tetraen-20-one, respectively. All these compounds are obtained as mixtures of isomers A and B.

EXAMPLE 20

A solution of the mixture of isomers A and B of the 3-methyl ether of 3,24-dihydroxy-17β,24-epoxy-19,21-dinorchola-1,3,5(10),22-tetraen-20-one (10 g.), obtained in Example 12, pyridine (100 ml.) and acetic anhydride (100 ml.) is stirred at room temperature for one hour. The solution is poured in ice-water and the resulting solid is filtered, washed with water and dried, yielding the 24-acetate of the 3-methyl ether of 3,24-dihydroxy-17β,24-epoxy-19,21-dinorchola-1,3,5(10),22-tetraen-20-one as a mixture of isomers A and B. Crystallization of this mixture with acetone-hexane affords pure isomer A M.P. 171–172° C. Further crystallization of the filtrates with acetone-ether yields pure isomer B M.P. 151–152° C.

EXAMPLE 21

A solution of the mixture of isomers A and B of the 3-cyclopentyl ether of 3,24-dihydroxy-17β,24-epoxy-19,21-dinorchola-1,3,5(10),22-tetraen-20-one (1 g.), obtained in Example 16, pyridine (10 ml.) and acetic anhydride (10 ml.) is stirred at room temperature for 50 minutes. The solution is diluted with ice-water and extracted with ether. The ether is washed with dilute sulfuric acid, sodium bicarbonate and water, dried and evaporated yielding the 24-acetate of the 3-cyclopentyl ether of 3,24-dihydroxy-17β,24-epoxy-19,21-dinorchola-1,3,5(10),22 - tetraen-20-one, as a mixture of isomers A and B. Crystallization from acetone-methanol affords pure isomer A M.P. 162–163° C.

In the same manner, acetylation of the mixtures of isomers A and B of the 3-ethyl, 3-propyl, 3-isopropyl, 3-n-butyl, 3-sec.-butyl, and 3-cyclohexyl ethers of 3,24-dihydroxy-17β,24-epoxy - 19,21 - dinorchola-1,3,5(10),22-tetraen-20-one, obtained in Example 16, affords the 24-acetates of the 3-ethyl, 3-propyl, 3-isopropyl, 3-n-butyl, 3-sec.-butyl and 3-cyclohexyl ether of 3,24-dihydroxy-17β, 24-epoxy-19,21-dinorchola-1,3,5(10),22-tetraen-20-one, as mixtures of isomers A and B.

In a similar manner acylation with the appropriate acylating agents of the mixtures of isomers A and B of the 3-methyl, 3-ethyl, 3-propyl, 3-isopropyl, 3-n-butyl, 3-sec.-butyl, 3-cyclopentyl and 3- cyclohexyl ethers of 3,24- dihydroxy-17β,24-epoxy-19,21-dinorchola - 1,3,5(10),22-tetraen-20-one affords the corresponding 24-acylates such as the 24-propanoates, 24-butanoates, 24-pentanoates, 24-hexanoates and 24-heptanoates of the 3-methyl, 3-ethyl, 3-propyl, 3-isopropyl, 3-n-butyl, 3-sec.-butyl, 3-cyclopentyl, 3-cyclohexyl ethers of 3,24-dihydroxy-17β,24-epoxy-19,21-dinorchola-1,3,5(10),22-tetraen-20-one. All these compounds are obtained as mixtures of isomers A and B.

EXAMPLE 22

By the procedure of Example 20, acylation of the mixof isomers A and B of the 3-methyl, 3-ethyl, 3-propyl, 3-isopropyl, 3-n-butyl, 3-sec.-butyl, 3-cyclopentyl and 3-cyclohexyl ethers of 3,24-dihydroxy-17β,24-epoxy-19,21-dinorchola-1,3,5,6,8(9),22-hexaen-20-one, described in Example 16, yields the corresponding 24-acylates such as the 24-acetates, 24-propanoates, 24-butanoates, 24-pentanoates, 24-hexanoates and 24-heptanoates of the 3-methyl, 3-ethyl, 3-propyl, 3-isopropyl, 3-n-butyl, 3-sec.-butyl, 3-cyclopentyl and 3-cyclohexyl ethers of 3,24-dihydroxy-17β,24-epoxy-19,21 - dinorchola-1,3,5,6,8(9),22-hexaen-20-one, as mixtures of isomers A and B.

Similarly the mixtures of isomers A and B of the 3-tetrahydropyranyl ethers of 3,24 - dihydroxy - 17β,24-epoxy-19,21-dinorchola-1,3,5(10),22-tetraen-20-one, 3,24-dihydroxy-17β,24-epoxy - 19,21 - dinorchola-1,3,5,6,8(9),22-hexaen-20-one and 7α,8-17β,24-diepoxy-3,24-dihydroxy-19,21-dinorchola-1,3,5(10),22-tetraen-20-one, described in Example 14, are acylated to yield the 24-acetates, 24-propanoates, 24-butanoates, 24-pentanoates, 24-hexanoates, and 24-heptanoates of the 3-tetrahydropyranyl ethers of 3,24-dihydroxy-17β,24-epoxy - 19,21-dinorchola-1,3, 5(10),22-tetraen-20-one, 3,24-dihydroxy-17β,24-epoxy-19, 21-dinorchola-1,3,5,6,8(9),22-hexaen-20-one and 7α,8-17β,24 - diepoxy-3,24-dihydroxy - 19,21 - dinorchola-1,3, 5(10),22-tetraen-20-one as mixtures of isomers A and B.

EXAMPLE 23

A solution of a mixture of isomers A and B of the 3-methyl ether of 7α,8-17β,24-diepoxy-3-24-dihydroxy-19,21-dinorchola-1,3,5(10),22-tetraen-20-one (16.5 g.) obtained in Example 17, pyridine (165 ml.) and acetic anhydride (165 ml.) is stirred for one hour at room temperature. The mixture is poured on ice-water and is extracted with ether. The ether is washed with dilute sulfuric acid, sodium bicarbonate and water. After drying and evaporating the solvent, the residue is crystallized several times from acetone-hexane yielding the 24-acetate of the 3-methyl ether of 7α,8-17β,24-diepoxy-3, 24-dihydroxy-19,21-dinorchola-1,3,5(10),22 - tetraen-20-one as mixtures of isomers A and B, M.P. 182–191° C.

Similarly a solution of pure isomer A of the 3-methyl ether of 7α,8-17β,24-diepoxy-3,24-dihydroxy-19,21-dinorchola-1,3,5(10),22-tetraen-20-one (4 g.), obtained in Example 17, pyridine (40 ml.) and acetic anhydride (40 ml.) is stirred at room temperature for 45 minutes. The mixture is poured in ice-water and the resulting solid is filtered, washed with water and dried. Crystallization of the solid with acetone-hexane and then methylene chloride-methanol affords pure isomer A of the 24-acetate of the 3-methyl ether of 7α,8-17β,24-diepoxy-3,24-dihydroxy-19,21-dinorchola-1,3,5(10),22-tetraen-20-one M.P. 224–225° C.

In a similar manner acylation with other acylating agents of the mixture of isomers of the 3-methyl ether of 7α,8-17β,24-diepoxy-3,24-dihydroxy-19,21-dinorchola-1,3,5(10),22-tetraen-20-one affords the corresponding 24-acylates, such as for example the 24-propanoate, 24-butanoate, 24-pentanoate, 24-hexanoate and 24-heptanoate of the 3-methyl ether of 7α,8-17β,24-diepoxy-3,24-dihydroxy-19,21-dinorchola - 1,3,5(10),22-tetraen-20-one as mixtures of isomers A and B.

Similarly acylation of the mixtures of isomers A and B of the 3-ethyl, 3-propyl, 3-isopropyl, 3-n-butyl, 3-sec.-butyl, 3-cyclopentyl and 3-cyclohexyl ethers of 7α,8-17β-24- diepoxy-3,24-dihydroxy-19,21 - dinorchola - 1,3,5(10),22-tetraen-20-one, obtained in Example 18, affords the corresponding 24-acylates such as for example the 24-acetates, 24-propanoates, 24-butanoates, 24-pentanoates, 24-hexanoates and 24-heptanoates on the 3-ethyl, 3-propyl, 3-isopropyl, 3-n-butyl, 3-sec.-butyl, 3-cyclopentyl and 3-cyclohexyl ethers of 7α,8-17β,24-diepoxy-3,24-dihydroxy-19,21-dinorchola-1,3,5(10),22-tetraen-20-one, as mixtures of isomers A and B.

EXAMPLE 24

A solution of a mixture of isomers A and B of 3,24-dihydroxy-17β,24-epoxy-19,21-dinorchola - 1,3,5(10),22-tetraen-20-one (13.5 g.) obtained in Example 15, pyridine (135 ml.) and acetic anhydride (135 ml.) is stirred at room temperature for 45 minutes. The solution is poured in ice-water and the resulting solid is filtered, washed with water and dried yielding the 3,24-diacetate of 3,24-dihydroxy-17β,24-epoxy - 19,21-dinorchola-1,3,5(10),22-tetraen-20-one as a mixture of isomers A and B. Crystallization of this mixture from methylene chloride-methanol yields pure isomer A, M.P. 187–188°.

In a similar manner acetylation of the mixtures of isomers A and B of 3,24-dihydroxy-17β,24-epoxy-19,21-dinorchola-1,3,5,6,8(9),22-hexaen-20-one and 7α,8-17β,24-diepoxy-3,24-dihydroxy-19,21 - dinorchola-1,3,5(10),22-estratetraen-20-one, also described in Example 15, yields the 3,24-diacetates of 3,24-dihydroxy-17β,24-epoxy-19,21-dinorchola-1,3,5,6,8(9),22-hexaen-20-one and 7α,8-17β,24 - diepoxy-3,24-dihydroxy-19,21 - dinorchola - 1,3,5(10),22-tetraen-20-one as mixtures of isomers A and B.

Similarly acylation with the appropriate acylating agents of mixtures of isomers A and B of 3,24-dihydroxy-17β,24-epoxy-19,21-dinorchola-1,3,5(10),22 - tetraen-20-one, 3,24-dihydroxy-17β,24-epoxy-19,21-dinorchola-1,3,5,6,8(9),22-hexaen-20-one and 7α,8-17β,24-diepoxy-3,24-dihydroxy-19,21 - dinorchola-1,3,5(10),22-tetraen-20-one, affords the corresponding 3,24-diacylates such as for example the 3,24-dipropanoates, 3,24-dibutanoates, 3,24-dipentanoates, 3,24-dihexanoates and 3,24-diheptanoates of 3,24-dihydroxy - 17β,24 - epoxy - 19,21-dinorchola-1,3,5(10),22-tetraen-20-one, 3,24-dihydroxy-17β,24-epoxy-19,21-dinorchola-1,3,5,6,8(9),22-hexaen-20-one and 7α,8-17β,24-diepoxy - 3,24 - dihydroxy-19,21-dinorchola-1,3,5(10),22-tetraen-20-one, as mixtures of isomers A and B.

By a similar procedure, acylation of the mixtures of isomers A and B of the 3-acetates, 3-propanoates, 3-butanoates, 3-pentanoates, 3-hexanoates and 3-heptanoates of 3,24-dihydroxy-17β,24-epoxy-19,21 - dinorchola-1,3,5(10),22-tetraen-20-one, 3,24 - dihydroxy-17β,24-epoxy-19,21,-dinorchola-1,3,5,6,8(9),22-hexaen-20-one and 7α,8-17β,24-diepoxy-3,24-dihydroxy - 19,21-dinorchola-1,3,5(10),22-tetraen-20-one, described in Example 19 yields the corresponding symmetrical and mixed 3,24-diacylates such as for example the 3,24-diacetates; 3-acetate, 24-propanoates; 3-acetate, 24-butanoates; 3-acetate, 24-pentanoates; 3-acetate, 24-hexanoates; 3-acetate, 24-heptanoates; 3-propanoate, 24-acetates; 3,24-dipropanoates; 3-propanoate, 24-butanoates; 3-propanoate, 24-pentanoates; 3-propanoate, 24 - hexanoates; 3 - propanoate, 24-heptanoates; 3-butanoate, 24-acetates; 3-butanoate, 24-propanoates; 3-butanoate, 24-pentanoate, 24-butanoates; 3,24-dipentanoates; 3-pentanoate, 24-hexanoates; 3-butanoate, 24-heptanoates; 3-pentanoate, 24-acetates; 3-pentanoate, 24-propanoates; 3-pentanoate, 24-butanoates; 3,24-dipentanoate; 3-pentanoate, 24-hexanoates; 3-pentanoate, 24-heptanoates; 3-hexanoate, 24-acetates; 3-hexanoate, 24-propanoates; 3-hexanoate, 24-butanoates; 3-hexanoate, 24-pentanoates; 3,24-dihexanoates; 3-hexanoate, 24-heptanoates; 3-heptanoate, 24-acetates; 3-heptanoate, 24-propanoates; 3-heptanoate, 24-butanoates; 3-heptanoate, 24-pentanoates; 3-heptanoate, 24 - hexanoates and 3,24-diheptanoates of 3,24-dihydroxy - 17β,24 - epoxy-19,21-dinorchola - 1,3,5(10),22-tetraen-20-one, 3,24-dihydroxy-17β,24-epoxy-19,21-dinorchola-1,3,5,6,8(9),22-hexaen-20-one and 7α,8-17β,24-diepoxy-3,24-dihydroxy - 19,21 - dinorchola-1,3,5(10),22-tetraen-20-one. All these compounds are obtained as mixtures of isomers A and B.

EXAMPLE 25

A solution of the mixture of isomers A and B of 3,24-dihydroxy-17β,24-epoxy - 19,21 - dinorchola-1,3,5(10),22-tetraen-20 one (1 g.), described in Example 15, acetic acid (15 ml.) and acetic anhydride (4 ml.) is refluxed for 10 minutes. The cooled solution is poured on sodium bicarbonate. The resulting solid is filtered, washed with water and dried. This solid is chromatographed. Fractions eluted with benzene-ethyl acetate 19:1 are combined and crystallized from acetone-hexane yielding a mixture of isomers A and B of the 24 acetate of 3,24-dihydroxy-17β,24-epoxy - 19,21 - dinorchola-1,3,5(10),22-tetraen-20-one, M.P. 221–223° (dec.).

In a similar manner acylation with other acylating agents of the mixture of isomers A and B of 3,24-dihydroxy - 17β,24 - epoxy - 19,21 - dinorchola-1,3,5(10),22-tetraen-20-one affords the corresponding 24-acylates such as the 24 - propanoate, 24 - butanoate, 24 - pentanoate, 24-hexanoate and 24 - heptanoate of 3,24-dihydroxy-17β,24-epoxy - 19,21 - dinorchola-1,3,5(10),22-tetraen-20-one as mixtures of isomers A and B.

By similar procedure the mixtures of isomers A and B of 3,24 - dihydroxy - 17β,24 - epoxy - 19,21 - dinorchola-1,3,5,6,8(9),22-hexaen-20-one and 7α,8-17β,24-diepoxy-3,24-dihydroxy - 19,21 - dinorchola-1,3,5(10),22-tetraen-20-one, described in Example 15, are acylated to afford the 24-acetates, 24-propanoates, 24-butanoates, 24-pentanoates, 24-hexanoates, 24-heptanoates of 3,24-dihydroxy-17β,24-epoxy - 19,21 - dinorchola-1,3,5,6,8(9),22-hexaen-20-one and 7α,8-17β,24-diepoxy-3,24-dihydroxy-19,21-dinorchola-1,3,5(10),22-tetraen-20-one as mixtures of isomers A and B.

EXAMPLE 26

A suspension of the mixture of isomers A and B of the 3-methyl ether of 3,24-dihydroxy-17β,24-epoxy-19,21-dinorchola-1,3,5(10),22-tetraen-20-one (5.0 g.), obtained in Example 12, methanol (250 ml.) and a 70% solution of perchloric acid (5 ml.) is stirred at room temperature for 20 minutes. The solid is filtered and washed with methanol. Further crystallization with methylene chloride-methanol yields the 3,24-dimethyl ether of 3,24-dihydroxy-17β,24-epoxy - 19,21 - dinorchola-1,3,5(10),22-tetraen-20-one, as a mixture of isomers A and B, M.P. 175–176° C.

Similarly the mixtures of isomers A and B of the 3-ethyl, 3-propyl, 3-isopropyl, 3-n-butyl, 3-sec.-butyl, 3-cyclopentyl, 3-cyclohexyl ethers of 3,24-dihydroxy-17β,24-epoxy - 19,21 - dinorchola-1,3,5(10),22-tetraen-20-one, described in Example 16 are converted into the corresponding 24-methyl ethers upon treatment with methanol and perchloric acid. In this manner there are obtained as mixtures of isomers A and B the 3-ethyl, 24-methyl; 3-propyl, 24-methyl; 3-isopropyl, 24-methyl; 3-n-butyl, 24-methyl; 3-sec.-butyl, 24-methyl; 3-cyclopentyl, 24-methyl and 3-cyclohexyl, 24-methyl diethers of 3,24-dihydroxy - 17β,24 - epoxy - 19,21 - dinorchola-1,3,5(10),22-tetraen-20-one.

In a similar manner etherification with other alcohols of the mixtures of isomers A and B of the 3-methyl, 3-ethyl, 3-propyl, 3-isopropyl, 3-n-butyl, 3-sec.-butyl, 3-cyclopentyl, 3-cyclohexyl ethers of 3,24-dihydroxy-17β,24 - epoxy-19,21-dinorchola-1,3,5(10),22-tetraen-20-one affords the corresponding 3,24-diethers such as for example the 3-methyl, 24-ethyl; 3-methyl, 24-propyl; 3-methyl, 24-isopropyl; 3-methyl, 24-n-butyl; 3-methyl, 24-sec.-butyl; 3-methyl, 24-cyclopentyl; 3-methyl, 24-cyclohexyl; 3,24-diethyl; 3-ethyl, 24-propyl; 3-ethyl, 24-isopropyl; 3-ethyl, 24-n-butyl; 3-ethyl, 24-sec.-butyl; 3-ethyl, 24-cyclopentyl; 3-ethyl, 24-cyclohexyl; 3-propyl, 24-ethyl; 3,24-dipropyl; 3-propyl, 24-isopropyl; 3-propyl, 24-n-butyl; 3-propyl, 24-sec.-butyl; 3-propyl, 24-cyclopentyl; 3-propyl, 24-cyclohexyl; 3-isopropyl, 24-ethyl; 3-isopropyl, 24-propyl; 3,24-diisopropyl; 3-isopropyl, 24-n-butyl; 3-isopropyl, 24-sec.-butyl; 3-isopropyl, 24-cyclopentyl; 3-isopropyl, 24-cyclohexyl; 3-n-butyl, 24-ethyl; 3-n-butyl, 24-propyl; 3-n-butyl, 24-isopropyl; 3,24-di-n-butyl; 3-n-butyl, 24-sec.-butyl; 3-n-butyl, 24-cyclopentyl; 3-n-butyl, 24-cyclohexyl; 3-sec.-butyl, 24-ethyl; 3-sec.-butyl, 24-propyl; 3-sec.-butyl, 24-n-butyl; 3,24-di-sec.-butyl; 3-sec.-butyl, 24-cyclopentyl; 3-sec.-butyl, 24-cyclohexyl; 3-cyclopentyl, 24-ethyl; 3-cyclopentyl, 24-propyl; 3-cyclopentyl, 24-isopropyl; 3-cyclopentyl, 24-n-butyl; 3-cyclopentyl, 24-sec.-butyl; 3,24-dicyclopentyl; 3-cyclopentyl, 24-cyclohexyl; 3-cyclohexyl, 24-ethyl; 3-cyclohexyl, 24-propyl; 3-cyclohexyl, 24-isopropyl; 3-cyclohexyl, 24-n-butyl; 3-cyclohexyl, 24-sec.-butyl; 3-cyclohexyl, 24-cyclopentyl and 3,24-dicyclohexyl diethers of 3,24 - dihydroxy-17β,24-epoxy-19,21-dinorchola-1,3,5(10),22-tetraen-20-one. All these compounds are obtained as mixtures of isomers A and B.

In a similar manner, etherification of the mixtures of isomers A and B of the 3-methyl, 3-ethyl, 3-propyl, 3-isopropyl, 3-n-butyl, 3-sec.-butyl, 3-cyclopentyl, 3-cyclohexyl ethers of 3,24-dihydroxy-17β,24-epoxy-19,21-dinorchola-1,3,5,6,8(9),22-hexaen-20-one and 7α,8-17β,24-diepoxy-3,24-dihydroxy - 19,21 - dinorchola - 1,3,5(10),22-tetraen-20-one affords the corresponding 3,24-diethers such as for example the 3,24-dimethyl; 3-methyl, 24-ethyl; 3-methyl, 24-propyl; 3-methyl, 24-isopropyl; 3-methyl, 24-n-butyl; 3-methyl, 24-sec.-butyl; 3-methyl, 24-cyclopentyl; 3-methyl, 24-cyclohexyl; 3-ethyl, 24-methyl; 3,24-diethyl; 3-ethyl, 24-propyl; 3-ethyl, 24-isopropyl; 3-ethyl, 24-n-butyl; 3-ethyl, 24-sec.-butyl; 3-ethyl, 24-cyclopentyl; 3-ethyl, 24-cyclohexyl; 3-propyl, 24-methyl, 3-propyl, 24-ethyl, 3,24-dipropyl; 3-propyl, 24-isopropyl; 3-propyl, 24-n-butyl; 3-propyl, 24-sec.-butyl; 3-propyl, 24-cyclopentyl; 3-propyl, 24-cyclohexyl; 3-isopropyl, 24-methyl; 3-isopropyl, 24-ethyl; 3-isopropyl, 24-propyl; 3,24-di-isopropyl; 3-isopropyl, 24-n-butyl; 3-isopropyl, 24-sec.-butyl; 3-isopropyl, 24-cyclopentyl; 3-isopropyl, 24-cyclohexyl; 3-n-butyl, 24-methyl; 3-n-butyl, 24-ethyl; 3-n-butyl, 24-propyl; 3-n-butyl, 24-isopropyl; 3,24-di-n-butyl; 3-n-butyl, 24-sec.-butyl; 3-n-butyl, 24-cyclopentyl, 3-n-butyl, 24-cyclohexyl; 3-sec.-butyl, 24-methyl; 3-sec.-butyl, 24-ethyl; 3-sec.-butyl, 24-propyl; 3-sec.-butyl, 24-isopropyl; 3-sec.-butyl, 24-n-butyl; 3,24-di-sec.-butyl; 3-sec.-butyl, 24-cyclopentyl; 3-sec.-butyl, 24-cyclohexyl; 3-cyclopentyl, 24-methyl; 3-cyclopentyl, 24-ethyl; 3-cyclopentyl, 24-propyl; 3-cyclopentyl, 24-isopropyl; 3-cyclopentyl, 24-n-butyl; 3-cyclopentyl, 24-sec.-butyl; 3,24-dicyclopentyl; 3-cyclopentyl, 24-cyclohexyl; 3-cyclohexyl, 24-methyl; 3-cyclohexyl, 24-ethyl; 3-cyclohexyl, 24-propyl; 3-cyclohexyl, 24-isopropyl; 3-cyclohexyl, 24-n-butyl; 3-cyclohexyl, 24-sec.-butyl; 3-cyclohexyl, 24-cyclopentyl and 3,24-dicyclohexyl diethers of 3,24-dihydroxy-17β,24-epoxy-19,21-dinorchola-1,3,5,6,8(9),22-hexaen-20-one and 7α,8-17β,24-diepoxy-3,24-dihydroxy - 19,21 - dinorchola-1,3,5(10),22-tetraen-20-one. All the above compounds are obtained as mixtures of isomers A and B.

EXAMPLE 27

A solution of the mixture of isomers A and B of 3,24 - dihydroxy - 17β,24-epoxy-19,21-dinorchola - 1,3,5-(10),22-tetraen-20-one (1 g.), obtained in Example 15, methanol (30 ml.) and a 70% perchloric acid solution (1 ml.) is stirred at room temperature for 30 minutes. The crystalline product is filtered and washed with methanol. This solid is further crystallized from methylene chloride-methanol yielding the 24-methyl ether of 3,24-dihydroxy-17β,24-epoxy-19,21 - dinorchola - 1,3,5(10),22-tetraen-20-one, as a mixture of isomers A and B M.P. 155–157° (dec).

In a similar manner the mixtures of isomers A and B of 3,24-dihydroxy - 17β,24-epoxy-19,21-dinorchola-1,3,5,6,8-(9),22 - hexaen-20-one and 7α,8-17β,24-diepoxy-3,24-dihydroxy-19,21-dinorchola-1,3,5(10),22-tetraen-20-one are treated with methanol and perchloric acid yielding mixtures of isomers A and B of the 24-methyl ethers of 3-24-dihydroxy-17β,24-epoxy - 19,21 - dinorchola - 1,3,5,6,8-(9)-,22-hexaen-20-one and 7α,8-17β,24-diepoxy-3,24-dihydroxy-19,21-dinorchola-1,3,5(10),22-tetraen-20-one.

By a similar manner etherification with the appropriate alcohols of mixtures of isomers A and B of 3,24-dihydroxy-17β,24-epoxy - 19,21 - dinorchola - 1,3,5(10),22-tetraen-20-one, 3,24-dihydroxy - 17β,24-epoxy-19,21 - dinorchola - 1,3,5,6,8(9),22 - hexaen-20-one and 7α,8-17β,-24-diepoxy-3,24 - dihydroxy-19,21 - dinorchola - 1,3,5-(10),22-tetraen-20-one yields the corresponding 24 ethers such as the 24-ethyl, 24-propyl, 24-isopropyl, 24-n-butyl, 24-sec.-butyl, 24-cyclopentyl, 24-cyclohexyl ethers of 3,24-dihydroxy-17β,24-epoxy-19,21 - dinorchola - 1,3,5(10),-22-tetraen-20-one, 3,24-dihydroxy - 17β,24 - epoxy-19,21-dinorchola - 1,3,5,6,8(9),22 - hexaen - 20 - one and 7α,8-17β,24-diepoxy-3,24-dihydroxy-19,21 - dinorchola - 1,3,5-(10),22-tetraen-20-one as mixtures of isomers A and B.

EXAMPLE 28

A solution of the mixture of isomers A and B of the 24 - methyl ether of 3,24 - dihydroxy - 17β,24-epoxy-19,21-dinorchola-1,3,5(10),22 - tetraen-20-one (130 mg.), obtained in Example 27, pyridine (1.3 ml.) and acetic anhydride (1.3 ml.) is stirred for one hour at room temperature. The solution is poured in ice-water. The solid is filtered, washed with water and dried, yielding the 3-acetate of the 24-methyl ether of 3,24 - dihydroxy-17β,24-epoxy - 19,21 - dinorchola - 1,3,5,(10),22-tetraen-20-one, as a mixture of isomers A and B M.P. 173–175°.

In a similar manner acetylation of the mixtures of isomers A and B of the 24-ethyl, 24-propyl, 24-isopropyl, 24-n-butyl, 24-sec.-butyl, 24-cyclopentyl, 24-cyclohexyl ethers of 3,24-dihydroxy-17β,24-epoxy - 19-21-dinorchola-1,3,5(10),22 - tetraen-20-one, described in Example 27, yields the corresponding 3 acetates of the 24-ethyl, 24-propyl, 24-isopropyl, 24-n-butyl, 24-sec.-butyl, 24-cyclopentyl, 24-cyclohexyl ethers of 3,24-dihydroxy-17β,24-epoxy-19,21-dinorchola - 1,3,5(10),22 - tetraen-20-one, as mixtures of isomers A and B.

Similarly acylation with other acylating agents of the mixtures of isomers A and B of the 24-methyl, 24-ethyl, 24-propyl, 24-isopropyl, 24-n-butyl, 24-sec.-butyl, 24-cyclopentyl and 24-cyclohexyl ethers of 3,24-dihydroxy-17β, 24-epoxy-19,21 - dinorchola-1,3,5(10),22 - tetraen - 20-one, yields the corresponding 3-acylates such as the 3-propanoates, 3-butanoates, 3-pentanoates, 3-hexanoates and 3-heptanoates of the 24-methyl, 24-ethyl, 24-propyl, 24-isopropyl, 24-n-butyl, 24-sec.-butyl, 24-cyclopentyl, 24-cyclohexyl ethers of 3,24-dihydroxy-17β,24-epoxy-19,21-dinorchola-1,3,5(10),22-tetraen-20-one, as mixtures of isomers A and B.

By a similar procedure the mixtures of isomers A and B of the 24-methyl, 24-ethyl, 24-propyl, 24-isopropyl, 24-n-butyl, 24-sec.-butyl, 24-cyclopentyl, 24-cyclohexyl ethers of 3,24 - dihydroxy - 17β,24-epoxy - 19,21-dinorchola-1,3,5,6,8(9),22-hexaen-20-one and 7α,8 - 17β,24 - diepoxy-3,24-dihydroxy-19,21 - dinorchola - 1,3,5(10),22-tetraen-20-one, described in Example 27, are esterified to yield the 3-acetates, 3-propanoates, 3-butanoates, 3-pentanoates, 3-hexanoates and 3-heptanoates of the 24-methyl- 24-propyl, 24-ethyl, 24-isopropyl, 24-n-butyl, 24-sec.-butyl, 24-cyclopentyl, 24-cyclohexyl ethers of 3,24 - dihydroxy-17β,24-epoxy-19,21-dinorchola-1,3,5,6,8(9),22 - hexaen - 20-one and 7α,8-17β,24 - diepoxy - 3,24-dihydroxy - 19,21 - dinorchola-1,3,5(10),22 - tetraen-20-one as mixtures of isomers A and B.

EXAMPLE 29

The mixtures of isomers A and B of the 24-methyl, 24-ethyl, 24-propyl, 24-isopropyl, 24-n-butyl, 24-sec.-butyl, 24-cyclopentyl, and 24-cyclohexyl ethers of 3,24-dihydroxy-17β,24-epoxy - 19,21-dinorchola-1,3,5(10),22-tetraen-20-one, 3,24 - dihydroxy - 17β,24 - epoxy-19,21-dinorchola-1,3,5,6,8(9),22-hexaen-20-one and 7α,8-17β,24-diepoxy-3,24 - dihydroxy - 19,21 - dinorchola-1,3,5(10),22-tetraen-20-one, are treated by dihydropyran in the presence of p-toluene-sulfonic acid in benzene solutions, according to the method of A. D. Cross described in Steroid, vol. 4, p. 423 (1964), to yield the 3-tetrahydropyranyl,24-methyl; 3-tetrahydropyranyl,24-ethyl, 3-tetrahydropyranyl, 24-propyl; 3-tetrahydropyranyl,24-isopropyl; 3-tetrahydropyranyl, 24-n-butyl; 3-tetrahydropyranyl,24-sec-butyl; 3-tetrahydropyranyl,24-cyclopentyl; 3-tetrahydropyranyl, 24-cyclohexyl diethers of 3,24-dihydroxy-17β,24 - epoxy-19-21-dinorchola - 1,3,5(10),22-tetraen-20-one, 3,24-dihydroxy-17β,24 - epoxy-19,21 - dinorchola - 1,3,5,6,8(9),-22-hexaen-20-one and 7α,8-17β,24-diepoxy - 3,24 - dihydroxy - 19,21-dinorchola-1,3,5(10),22-tetraen-20-one, as mixtures of isomers A and B.

EXAMPLE 30

To a solution of the mixtures of isomers A and B of the 3-tetrahydropyranyl ether of 3,24-dihydroxy - 17β,24-epoxy-19,21-dinorchola-1,3,5(10),22 - tetraen-20-one (62 g.), described in Example 14, in acetone (2500 ml.) is added at 10° a 8 N chromic acid solution (81 ml.). After stirring for 20 minutes at 10° the excess oxidant is destroyed by the addition of isopropanol. Water is added and most of the solvent is evaporated under reduced pressure. The resulting solid is filtered, washed with water and dried. This solid is purified by chromatography on silica gel. The fractions eluted with mixtures of benzene-ethyl acetate (19:1 and 9:1) are combined yielding 3,17β - dihydroxy - 20-oxo-19,21-dinorchola - 1,3,5-(10),22-tetraenoic acid δ-lactone M.P. 278–280° C.

In a similar manner oxidation of the mixtures of isomers A and B of the 3-tetrahydropyranyl ethers of 3,24-dihydroxy-17β,24-epoxy-19,21 - dinorchola - 1,3,5,6,8(9),-22-hexaen - 20 - one and 7α,8-17β,24-diepoxy-3,24-dihydroxy - 19,21-dinorchola - 1,3,5(10),22 - tetraen - 20-one yields respectively 3,17β-dihydroxy-20-oxo-19,21-dinorchola-1,3,5,6,8(9),22-hexaenoic acid δ-lactone and 3,17β-dihydroxy-7α,8-epoxy-20-oxo-19,21 - dinorchola - 1,3,5-(10),22-tetraenoic acid δ-lactone.

EXAMPLE 31

To a solution of the mixture of isomers A and B of the 3-methyl ether of 3,24-dihydroxy-17β,24-epoxy-19,21-dinorchola-1,3,5(10),22-tetraen-20-one (20 g.) obtained in Example 12, in purified acetone (1000 ml.) is added a 8 N chromic acid solution (26.4 ml.). The temperature of the solution is kept at 10° during the addition of the oxidant. After stirring for an additional 10 minutes, isopropanol is added, followed by water. The acetone is evaporated and the solid residue is filtered, washed with water and dried. This solid is crystallized from methylene chloride methanol, yielding the 3-methyl ether of 3,17β-dihydroxy-20-oxo-19,21-dinorchola-1,3,5(10) - 22 - tetraenoic acid δ-lactone M.P. 206–207° C.

In a smilar manner the mixture of isomers A and B of the 3-ethyl, 3-propyl, 3-isopropyl, 3 - n - butyl, 3-sec.-butyl and 3-cyclohexyl ethers of 3,24-dihydroxy-17β,24-epoxy-19,21-dinorchola-1,3,5(10),22-tetraen-20 - one, described in Example 16, are oxidized to yield respectively the 3-ethyl, 3-propyl, 3-isopropyl, 3-n-butyl, 3-sec.-butyl and 3-cyclohexyl ethers of 3,17β-dihydroxy-20-oxo-19,21-dinorchola-1,3,5(10),22-tetraenoic acid δ-lactone.

Similarly the mixtures of isomers A and B of the 3-methyl, 3-ethyl, 3-propyl, 3-isopropyl, 3-n-butyl, 3-sec.-butyl, 3-cyclopentyl and 3-cyclohexyl ethers of 3,24-dihydroxy-17β,24-epoxy-19,21 - dinorchola-1,3,5,6,8(9),22-hexaen - 20 - one are oxidized to yield respectively the 3-methyl, 3-ethyl, 3-propyl, 3-isopropyl, 3-n-butyl, 3-sec.-butyl, 3-cyclopentyl and 3-cyclohexyl ethers of 3,17β-dihydroxy-20-oxo-19,21-dinorchola - 1,3,5,6,8(9),22-hexaenoic acid δ-lactone, respectively.

EXAMPLE 32

To a solution of the mixture of isomers A and B of the 3-cyclopentyl ether of 3,24-dihydroxy-17β,24-epoxy-19,21-dinorchola-1,3,5(10),22-tetraen - 20-one (4.25 g.), described in Example 16, in acetone (210 ml.) is added at 10° a 8 N chromic acid solution (5.6 ml.). The mixture is stirred for 10 minutes, then the excess oxidant is decomposed by the addition of isopropanol. The acetone is evaporated and the residue is diluted with water. The resulting solid is filtered, washed with water and dried. Crystallization of this solid from methylene chloride-methanol affords the 3-cyclopentyl ether of 3,17β-dihydroxy-20-oxo-19,21-dinorchola - 1,3,5(10),22 - tetraenoic acid δ-lactone M.P. 230–232° C.

EXAMPLE 33

A solution of 3,17β - dihydroxy-20-oxo-19,21 - dinorchola-1,3,5(10),22-tetraenoic acid δ-lactone (8.5 g.) described in Example 30, pyridine (85 ml.) and acetic anhydride (85 ml.) is stirred at room temperature for 30 minutes. The solution is poured into ice-water and the resulting solid is filtered, washed with water and dried. The solid is chromatographed on silica gel. The fractions eluted with benzene-ethyl acetate (19:1) are combined and crystallized from acetone-hexane yielding the 3-acetate of 3,17β-dihydroxy-20-oxo-19,21-dinorchola - 1,3,5(10), 22-tetraenoic acid δ-lactone M.P. 191–192° C.

In a similar manner but replacing acetic anhydride by other acylating agents, 3,17β-dihydroxy-20-oxo-19,21-dinorchola-1,3,5(10),22-tetraenoic acid δ-lactone is esterified to yield the 3-propanoate, 3-butanoate, 3-pentanoate, 3-hexanoate and 3-heptanoate of 3,17β-dihydroxy-20-oxo-19,21-dinorchola, 1,3,5(10),22-tetraenoic acid δ-lactone.

By a similar procedure acylation of 3,17β-dihydroxy-20-oxo-19,21-dinorchola-1,3,5,6,8(9),22 - hexaenoic acid and 3,17β-dihydroxy-7α,8 - epoxy - 20 - oxo - 19,21-dinorchola - 1,3,5(10),22 - tetraenoic acid δ - lactone, described in Example 30, affords the corresponding 3-acylates such as for example the 3-acetates, 3-propionates, 3-butanoates, 3-pentanoates, 3-hexanoates, 3-heptanoates of 3,17β - dihydroxy-20-oxo-19,21-dinorchola - 1,3,5,6,8 (9),22-hexaenoic acid δ-lactone and 3,17β-dihydroxy-7α, 8-epoxy-20-oxo-19,21-dinorchola-1,3,5(10),22 - tetraenoic acid δ-lactone.

EXAMPLE 34

To a solution of the mixture of isomers A and B of the 3-methyl ether of 7α,8-17β,24-diepoxy-3,24 - dihydroxy-19,21-dinorchola-1,3,5(10),22 - tetraen - 20 - one (22.1 g.), described in Example 17, in acetone (490 ml.) is added at 10° a 8 N chromic acid solution (28.5 ml.). After stirring for an additional 30 minutes, the excess oxidant is destroyed with isopropanol. Water is added and the solvent is evaporated under reduced pressure. The resulting solid is filtered, washed with water and dried. This solid is chromatographed on silica gel. The fractions eluted with a mixture of 19:1 benzene-ethyl acetate are combined and crystallized from methylene chloride-methanol yielding the 3-methyl ether of 3,17β-dihydroxy-7α,8-epoxy-20-oxo-19,21-dinorchola - 1,3,5(10),22 - tetraenoic acid δ-lactone M.P. 227–230° C.

In a similar manner, oxidation of the mixtures of isomers of the 3-ethyl, 3-propyl, 3-isopropyl, 3-n-butyl, 3-sec.-butyl, 3-cyclopentyl, 3-cyclohexyl ethers of 7α,8-17β,24-diepoxy-3,24-dihydroxy-19,21 - dinorchola - 1,3,5 (10),22-tetraen - 20 - one yields the corresponding ketolactones such as the 3-ethyl, 3-propyl, 3-isopropyl, 3-n-butyl, 3-sec.-butyl, 3-cyclopentyl, 3-cyclohexyl ethers of 3,17β-dihydroxy-7α,8-epoxy-20 - oxo - 19,21 - dinorchola-1,3,5(10),22-tetraenoic acid δ-lactone.

EXAMPLE 35

By a procedure similar to the one described by A. D. Cross et al., in Steroids, vol. 4, p. 423 (1964), 3,17β-dihydroxy - 20 - oxo - 19,21 - dinorchola - 1,3,5(10),22- tetraenoic acid δ-lactone, 3,17β-dihydroxy - 20 - oxo - 19,21-dinorchola - 1,3,5,6,8(9),22 - hexaenoic acid δ-lactone and 3,17β-dihydroxy - 7α,8 - epoxy - 20 - oxo - 19,21-dinorchola - 1,3,5(10),22 - tetraenoic acid δ-lactone, described in Example 30, are treated with dihydropyran in benzene solutions and in presence of p-toluenesulfonic acid to yield the corresponding 3-tetrahydropyranyl ethers of 3,17β-dihydroxy - 20 - oxo - 19,21 - dinorchola - 1,3,5 (10),22 - tetraenoic acid δ-lactone, 3,17β - dihydroxy-20-oxo - 19,21 - dinorchola - 1,3,5,6,8(9),22 - hexaenoic acid δ-lactone and 3,17β - dihydroxy - 7α,8 - epoxy - 20 - oxo - 19,21-dinorchola -1,3,5(10),22-tetraenoic acid δ-lactone.

EXAMPLE 36

To a suspension of prehydrogenated 10% palladium on calcium carbonate (625 mg.) in a little dioxan is added a solution of the mixture of isomers A and B of the 3-methyl ether of 3,24-dihydroxy-17β,24-epoxy-19,21-dinorchola-1,3,5(10),22-tetraen-20-one (2.5 g.), described in Example 12, in dioxan (100 ml.). The mixture is hydrogenated for 35 minutes at room temperature and at normal pressure. The catalyst is filtered and washed with dioxan. The filtrate is evaporated to dryness. The residue is purified by precipitation from acetone-hexane yielding amorphous 3-methyl ether of 3,24-dihydroxy-17β,24-epoxy-19,21-dinorchola-1,3,5(10)-trien-20-one, as a mixture of isomers A and B.

Similarly, hydrogenation of the mixtures of isomers A and B of the 3-ethyl, 3-propyl, 3-isopropyl, 3-n-butyl, 3-sec.-butyl, 3-cyclopentyl and 3-cyclohexyl ethers of 3,24-dihydroxy - 17β,24-epoxy - 19,21-dinorchola - 1,3,5(10), 22-tetraen-20-one, prepared in Example 16, affords the 3-ethyl, 3-propyl, 3-isopropyl, 3-n-butyl, 3-sec.-butyl, 3-cyclopentyl, 3-cyclohexyl ethers of 3,24-dihydroxy-17β, 24-epoxy-19,21-dinorchola-1,3,5(10)-trien-20-one, as mixtures of isomers A and B.

In a similar manner the mixtures of isomers A and B of 3-methyl, 3-ethyl, 3-propyl, 3-isopropyl, 3-n-butyl, 3-sec.-butyl, 3-cyclopentyl, 3-cyclohexyl ethers of 3,24-dihydroxy - 17β,24 - epoxy - 19,21-dinorchola-1,3,5,6,8(9), 22-hexaen-20-one, obtained in Example 16, are hydrogenated to yield the 3-methyl, 3-ethyl, 3-propyl, 3-isopropyl, 3-n-butyl, 3-sec.-butyl, 3-cyclopentyl, 3-cyclohexyl, ethers of 3,24-dihydroxy-17β,24-epoxy-19,21-dinorchola-1,3,5,6,8(9)-pentaen - 20 - one, as mixtures of isomers A and B.

By a similar procedure, hydrogenation of the mixtures of isomers A and B of the 3-methyl, 3-ethyl, 3-propyl, 3-isopropyl, 3-n-butyl, 3-sec.-butyl, 3-cyclopentyl, 3-cyclohexyl ethers of 7α,8-17β,24-diepoxy - 3,24 - dihydroxy-19, 21-dinorchola-1,3,5(10),22-tetraen-20-one, obtained in Example 17, affords the 3-methyl, 3-ethyl, 3-propyl, 3-isopropyl, 3-n-butyl, 3-sec.-butyl, 3-cyclopentyl, 3-cyclohexyl ethers of 7α,8-17β,24-diepoxy-3,24-dihydroxy-19,21-dinorchola-1,3,5(10)-trien-20-one, as mixtures of isomers A and B.

Similarly hydrogenation of the mixtures of isomers A and B of the 3-tetrahydropyranyl ethers of 3,24-dihydroxy-17β,24-epoxy-19,21-dinorchola-1,3,5(10),22 - tetraen - 20-one, 3,24 - dihydroxy-17α,24-epoxy-19,21-dinorchola-1,3-5,6,8(9),22-hexaen-20-one and 7α,8-17β,24-diepoxy-3, 24-dihydroxy-19,21-dinorchola-1,3,5(10),22-tetraen - 20-one, described in Example 14, yields the 3-tetrahydropyranyl ethers of 3,24-dihydroxy-17β,24-epoxy-19,21-dinorchola-1,3,5(10)-trien-20-one, 3,24-dihydroxy-17β,24-epoxy-19,21-dinorchola-1,3,5,6,8(9)-pentaen-20-one and 7α,8-17β,24-diepoxy-3,24-dihydroxy-19,21-dinorchola-1,3, 5(10)-trien-20-one, respectively as mixtures of isomers A and B.

In a similar manner the mixtures of isomers A and B of 3,24 - dihydroxy-17β,24-epoxy-19,21-dinorchola-1,3,5 (10),22-tetraen-20-one, 3,24-dihydroxy-17β,24-epoxy-19, 21-dinorchola-1,3,5,6,8(9),22-hexaen-20-one and 7α,8-17β,24-diepoxy-3,24-dihydroxy-19,21 - dinorchola - 1,3,5 (10),22-tetraen-20-one, obtained in Example 15, are hydrogenated to yield mixtures of isomers A and B of 3, 24-dihydroxy-17β,24-epoxy-19,21-dinorchola - 1,3,5(10)-trien-20-one, 3,24-dihydroxy-17β,24-epoxy-19,21-dinorchola-1,3,5,6,8(9)-pentaen-20-one and 7α,8-17β,24-diepoxy-3,24-dihydroxy-19,21-dinorchola-1,3,5(10) - trien-20-one.

By a similar procedure, hydrogenation of the mixtures of isomers A and B of the 3-acetates, 3-propanoates, 3-butanoates, 3-pentanoates, 3-hexanoates, and 3-heptanoates, of 3,24-dihydroxy-17β,24-epoxy-19,21-dinorchola-1,3,5(10), 22-tetraen-20-one, 3,24-dihydroxy-17β,24-epoxy-19,21-dinorchola-1,3,5,6,8(9),22 - hexaen-20-one and 7α,8-17β,24-diepoxy-3,24-dihydroxy-19,21-dinorchola - 1,3,5(10),22-tetraen-20-one, described in Example 19, affords the 3-acetates, 3-propanoates, 3-butanoates, 3-pentanoates, 3-hexanoates and 3-heptanoates of 3,24-dihydroxy-17β,24-epoxy-19,21-dinorchola-1,3,5(10)-trien-20-one, 3,24-dihydroxy-17β,24-epoxy - 19,21-dinorchola - 1,3,5,6,8(9)-pentaen-20-one and 7α,8-17β,24-diepoxy-3,24-dihydroxy-19,21-dinorchola-1,3,5(10)-trien-20-one. Those compounds are all obtained as mixtures of isomers A and B.

EXAMPLE 37

To a suspension of prehydrogenated 10% palladium on calcium carbonate (100 mg.) in a small volume of dioxan, is added a solution of pure isomer A of the 24-acetate of the 3-methyl ether of 3,24-dihydroxy-17β,24-epoxy-19,21-dinorchola-1,3,5(10),22-tetraen-20-one (200 mg.), described in Example 20, in dioxan (8 ml.). The mixture is hydrogenated for 5 minutes. The catalyst is filtered, washed with dioxan. The filtrate is evaporated to dryness to yield pure isomer A of the 24-acetate of the 3-methyl ether of 3,24 - dihydroxy17β,24 - epoxy-19,21-dinorchola-1,3,5-(10)-trien-20-one.

Alternatively in a similar manner, hydrogenation of the mixtures of isomers A and B of the 24-acetate of the 3-methyl ether of 3,24-dihydroxy - 17β,24 - epoxy-19,21-dinorchola-1,3,5(10),22-tetraen-20-one, described in Example 20, affords the 24-acetate of the 3-methyl ether of 3,24-dihydroxy-17β,24-epoxy - 19,21 - dinorchola - 1,3,5(10)-trien-20-one, as mixtures of isomers A and B.

Similarly, hydrogenation of the mixtures of isomers A and B of the 24-acetates of the 3-ethyl, 3-propyl, 3-isopropyl, 3-n-butyl, 3-sec.-butyl, 3-cyclopentyl, 3-cyclohexyl ethers of 3,24-dihydroxy-17β,24-epoxy-19,21-dinorchola-1,3,5(10),22-tetraen-20-one, obtained in Example 21, affords the 24-acetates of the 3-ethyl, 3-propyl, 3-isopropyl, 3-n-butyl, 3-sec.-butyl, 3-cyclopentyl, 3-cyclohexyl ethers of 3,24-dihydroxy - 17β,24 - epoxy-19,21-dinorchola-1,3,5 (10)-trien-20-one, as mixtures of isomers A and B.

By a similar procedure, the mixtures of isomers A and B of the 24 - propanoates, 24-butanoates, 24-pentanoates, 24-hexanoates and 24-heptanoates of the 3-methyl, 3-ethyl, 3-propyl, 3-isopropyl, 3-n-butyl, 3-sec.-butyl, 3-cyclopentyl, 3-cyclohexyl ethers of 3,24-dihydroxy-17β,24-epoxy-19,21-dinorchola-1,3,5(10),22 - tetraen-20-one, described in Example 21, are hydrogenated to yield the 24-propanoates, 24 - butanoates, 24 - pentanoates, 24-hexanoates, 24-heptanoates of the 3-methyl, 3-ethyl, 3-propyl, 3-isopropyl, 3-n-butyl, 3-sec.-butyl, 3-cyclopentyl, 3-cyclohexyl ethers of 3,24-dihydroxy-17β,24-epoxy-19,21-dinorchola-1,3,5(10)trien-20-one as mixtures of isomers A and B.

Similarly hydrogenation of the mixtures of isomers A and B of the 24-acetates, 24-propanoates, 24-butanoates, 24-pentanoates, 24-hexanoates, 24-heptanoates of the 3-mehtyl, 3-ethyl, 3-propyl, 3-isopropyl, 3-n-butyl, 3-sec.-butyl, 3-cyclopentyl, 3-cyclohexyl ethers of 3,24-dihydroxy-17β,24-epoxy-19,21-dinorchola - 1,3,5,6,8(9),22-hexaen-20-one, obtained in Example 22, gives the 24-acetates, 24-propanoates, 24-butanoates, 24-pentanoates, 24-hexanoates and 24-heptanoates of the 3-methyl, 3-ethyl, 3 - propyl, 3-isopropyl, 3-n-butyl, 3-sec.-butyl, 3-cyclopentyl, 3-cyclohexyl ethers of 3,24-dihydroxy-17β, 24-epoxy-19,21-dinorchola-1,3,5,6,8(9)-pentaen-20 - one, as mixtures of isomers A and B.

Similarly the mixtures of isomers A and B of the 24-acetates, 24-propanoates, 24-butanoates, 24-pentanoates, 24-hexanoates, 24-heptanoates of the 3-tetrahydropyranyl ethers of 3,24 - dihydroxy - 17β,24 - epoxy - 19,21-dinorchola - 1,3,5(10),22 - tetraen - 20 - one, 3,24-dihydroxy - 17β,24 - epoxy - 19, 21 - dinorchola-1,3,5,6,8 (9),22 - hexaen - 20 - one and 7α,8 - 17β,24 - diepoxy-3,24 - dihydroxy - 19,21 - dinorchola - 1,3,5(10),22- tetraen - 20 - one, described in Example 22, are hydrogenated to afford the 24-acetates, 24-propanoates, 24-butanoates, 24 - pentanoates, 24 - hexanoates and 24-heptanoates of the 3-tetrahydropyranyl ethers of 3,24-dihydroxy - 17β,24 - epoxy - 19,21 - dinorchola - 1,3,5 (10) - trien - 20 - one, 3,24 - dihydroxy - 17β,24 - epoxy-19, 21 - dinorchola - 1,3,5,6,8(9) - pentaen - 20 - one and 7α,8 - 17β,24 - diepoxy - 3,24 - dihydroxy - 19, 21-dinorchola - 1,3,5(10) - trien - 20 - one, as mixtures of isomers A and B.

In a similar manner the mixtures of isomers A and B of the 24-acetates, 24-propanoates, 24-butanoates, 24-pentanoates, 24-hexanoates, 24 - heptanoates of the 3-methyl, 3 - ethyl, 3 - propyl, 3 - isopropyl, 3 - n - butyl, 3 - sec. - butyl, 3 - cyclopentyl, 3 - cyclohexyl ethers of 7α,8-17β,24 - diepoxy - 3,24 - dihydroxy - 19,21-dinorchola - 1,3,5(10),22 - tetraen - 20 - one, described in Example 23, are hydrogenated to give the 24 - acetates, 24 - propanoates, 24 - butanoates, 24 - pentanoates, 24-hexanoates, 24 - heptanoates of the 3 - methyl, 3 - ethyl, 3 - propyl, 3 - isopropyl, 3 - n - butyl, 3 - sec. - butyl, 3 - cyclopentyl, 3 - cyclohexyl ethers of 7α,8-17β,24-diepoxy - 3,24 - dihydroxy - 19,21 - dinorchola-1,3,5(10)-trien - 20 - one, as mixtures of isomers A and B.

Similarly, hydrogenation of the mixtures of isomers A and B of symmetrical and mixed 3,24 - diesters of 3,24-dihydroxy - 17β,24 - epoxy - 19,21 - dinorchola - 1,3,5 (10),22 - tetraen - 20 - one, 3, 24 - dihydroxy - 17β,24-epoxy - 19,21 - dinorchola - 1,3,5,6,8(9),22-hexaen-20-one and 7α,8 - 17β,24 - diepoxy - 3,24 - dihydroxy - 19,21-dinorchola - 1,3,5(10),22 - tetraen - 20 - one, described in Example 24, yields the corresponding mixtures of isomers A and B of the symmetrical and mixed 3,24 - diesters of 3,24 - dihydroxy - 17β,24 - epoxy - 19,21 - dinorchola-1,3,5(10) - trien - 20 - one, 3,24 - dihydroxy - 17β,24-epoxy - 19,21 - dinorchola - 1,3,5,6,8(9) - pentaen - 20-one, and 7α,8-17β,24 - diepoxy - 3,24 - dihydroxy - 19,21-dinorchola - 1,3,5(10) - trien - 20 - one, such as for example: the 3,24 - diacetates; 3 - acetate,24 - propanoates; 3 - acetate, 24 - butanoates; 3 - acetate, 24-pentanoates; 3 - acetate, 24 - hexanoates; 3 - acetate, 24-heptanoates; 3 - propanoates, 24 - acetates; 3,24 - dipropanoates; 3 - propanoate, 24 - butanoates; 3 - propanoate, 24 - pentanoates; 3 - propanoate, 24 - hexanoates; 3 - propanoate, 24 - heptanoates; 3 - butanoate, 24 - acetates; 3 - butanoate, 24 - propanoates; 3,24 - dibutanoates; 3 - butanoate, 24 - pentanoates; 3- butanoate, 24 - hexanoates; 3 - butanoate, 24 - heptanoates; 3-pentanoate, 24 - acetates; 3 - pentanoate, 24 - propanoates; 3 - pantanoate, 24 - butanoates; 3,24 - dipentanoates; 3 - pentanoate, 24 - hexanoates; 3 - pentanoate, 24 - heptanoates; 3 - hexanoate, 24 - acetates; 3 - hexanoate, 24 - propanoates; 3 - hexanoate, 24 - butanoates; 3 - hexanoate, 24 - pentanoates, 3,24 - dihexanoates; 3-hexanoate, 24 - heptanoates; 3 - heptanoate, 24 - acetates; 3 - heptanoate, 24 - propanoates; 3 - heptanoate, 24-butanoates; 3 - heptanoate, 24 - pentanoates; 3-heptanoate, 24-hexanoates and 3,24-diheptanoates.

In a similar manner the mixtures of isomers A and B of the 24 - acetates, 24 - propanoates, 24 - butanoates, 24 - pentanoates, 24 - hexanoates, 24 - heptanoates of 3,24 - dihydroxy - 17β,24 - epoxy - 19,21 - dinorchola-1,3,5(10),22 - tetraen - 20 - one, 3,24-dihydroxy-17β,24-epoxy - 19,21 - dinorchola - 1,3,5,6,8(9),22 - hexaen-20-one and 7α,8 - 17β,24 - diepoxy - 3,24 - dihydroxy-19,21- dinorchola - 1,3,5(10),22 - tetraen - 20 -one, obtained in Example 25, are hydrogenated to yield mixtures of isomers A and B of the 24-acetates, 24 - propanoates, 24 - butanoates, 24 - pentanoates, 24 - hexanoates, and 24 - heptanoates of 3,24 - dihydroxy - 17β,24 - epoxy-19,21 - dinorchola - 1,3,5(10) - trien 20 - one, 3,24-dihydroxy - 17β,24 - epoxy - 19,21 - dinorchola-1,3,5,6,8 (9) - pentaen - 20 - one and 7α,8 - 17β,24-diepoxy-3,24-dihydroxy - 19,21 - dinorchola - 1,3,5(10)-trien-20-one.

EXAMPLE 38

To a suspension of prehydrogenated 10% palladium on calcium carbonate (435 mg.) in a small volume of ethyl acetate, is added a solution of the mixture of isomers A and B of the 3,24 - dimethyl ether of 3,24-dihydroxy - 17β,24 - epoxy - 19,21-dinorchola-1,3,5(10), 22 - tetraen - 20 - one, (1.7 g.) described in Example 26, in ethyl acetate (100 ml.). The mixture is hydrogenated for 15 minutes at room temperature and at normal pressure. The catalyst is filtered and washed with ethyl acetate. After evaporating the filtrate, the residue is crystallized from methylene chloride - acetone yielding the 3,24-dimethyl ether of 3,24 - dihydroxy - 17β,24 - epoxy-19,21 - dinorchola - 1,3,5(10) - trien - 20 - one as a mixture of isomers A and B M.P. 147–148°.

In the same manner, the mixtures of isomers A and B of the other symmetrical and mixed 3,24 - diethers of 3,24 - dihydroxy - 17β,24 - epoxy - 19,21 - dinorchola-1,3,5(10),22 - tetraen - 20 - one, described in Example 26, are hydrogenated to yield the corresponding mixtures of isomers A and B of the 3,24 - diethers of 3,24-dihydroxy - 17β,24 - epoxy - 19,21 - dinorchola - 1,3,5(10)-trien - 20 - one such as the 3 - methyl, 24 - ethyl; 3-methyl, 24 - propyl; 3 - methyl, 24 - isopropyl; 3 - methyl, 24 - n - butyl; 3 - methyl, 24 - sec. - butyl; 3 - methyl, 24 - cyclopentyl; 3 - methyl, 24 - cyclohexyl; 3 - ethyl, 24 - methyl; 3,24 - diethyl; 3 - ethyl, 24 - propyl; 3-ethyl, 24 - isopropyl; 3 - ethyl, 24 - n - butyl; 3 - ethyl, 24-sec.-butyl; 3 - ethyl, 24 - cyclopentyl; 3 - ethyl, 24 - cyclohexyl; 3 - propyl, 24 - methyl; 3 - propyl, 24 - ethyl; 3,24 - dipropyl; 3 - propyl, 24 - isopropyl; 3 - propyl, 24 - n - butyl; 3 - propyl, 24 - sec. - butyl; 3 - propyl, 24 - cyclopentyl; 3 - propyl, 24 - cyclohexyl; 3 - isopropyl, 24 - methyl; 3-isopropyl, 24 - ethyl; 3 - isopropyl, 24 - propyl; 3,24-diisopropyl; 3 - isopropyl, 24 - n - butyl; 3 - isopropyl, 24-sec. - butyl; 3 - isopropyl, 24 - cyclopentyl; 3 - isopropyl, 24 - cyclohexyl; 3 - n - butyl, 24 - methyl; 3 - n - butyl, 24 - ethyl; 3 - n - butyl, 24 - propyl; 3 - n - butyl, 24-isopropyl; 3,24 - dibutyl; 3 - n - butyl, 24 - sec. - butyl; 3 - n - butyl, 24 - cyclopentyl; 3 - n - butyl, 24 - cyclohexyl; 3 - sec. - butyl, 24 - methyl; 3 - sec. - butyl, 24 - ethyl; 3-sec. - butyl, 24 - propyl; 3 -sec. - butyl, 24 - isopropyl; 3-sec. - butyl, 24 - n - butyl; 3,24 - di - sec. - butyl; 3-sec.-butyl, 24 - cyclopentyl; 3 -sec. - butyl, 24 cyclohexyl; 3 - cyclopentyl, 24 - methyl; 3 - cyclopentyl, 24 - ethyl; 3-cyclopentyl, 24 - propyl; 3 - cyclopentyl, 24 - isopropyl; 3-cyclopentyl, 24 - n - butyl; 3 - cyclopentyl, 24 - sec. - butyl; 3,24 - dicyclopentyl; 3 - cyclopentyl, 24 - cyclohexyl; 3-cyclohexyl, 24 - methyl; 3 - cyclohexyl, 24 - ethyl; 3-cyclohexyl, 24 - propyl; 3 - cyclohexyl, 24 - isopropyl; 3-cyclohexyl, 24 - n - butyl; 3 - cyclohexyl, 24 - sec. - butyl; 3 - cyclohexyl, 24 - cyclopentyl and 3,24-dicyclohexyl.

Similarly, hydrogenation of the mixtures of isomers A and B of the symmetrical and mixed 3,24-diethers of 3,24-dihydroxy - 17β,24 - epoxy - 19,21-dinorchola-1,3,5,6,8(9) 22-hexaen-20-one and 7α,8-17β,24-diepoxy-3,24 - dihydroxy-19,21-dinorchola-1,3,5(10),22-tetra - 20 - one, described in Example 26, affords the corresponding mixtures of isomers A and B of the 3,24-diethers of 3,24-dihydroxy-17β,24-epoxy - 19,21 - dinorchola - 1,3,5,6,8(9)-pentaen-20-one and 7α,8-17β,24-diepoxy-3,24-dihydroxy-19,21-dinorchola-1,3,5(10)-trien-20-one, such as the 3,24-dimethyl; 3-methyl, 24-ethyl; 3-methyl, 24-propyl; 3-methyl, 24-isopropyl; 3-methyl, 24-n-butyl; 3-methyl, 24- sec.-butyl; 3-methyl, 24-cyclopentyl; 3-methyl, 24-cyclohexyl; 3-ethyl, 24-methyl; 3,24-diethyl; 3-ethyl, 24-propyl; 3-ethyl, 24-isopropyl; 3-ethyl, 24-n-butyl; 3-ethyl, 24-sec.-butyl; 3-ethyl, 24-cyclopentyl; 3-ethyl, 24-cyclohexyl; 3-propyl, 24-methyl; 3-propyl, 24-ethyl; 3,24-dipropyl; 3-propyl, 24-isopropyl; 3-propyl, 24-n-butyl; 3-propyl, 24-sec.-butyl; 3-propyl, 24-cyclopentyl; 3-propyl, 24-cyclohexyl; 3-isopropyl, 24 methyl; 3-isopropyl, 24-ethyl; 3-isopropyl, 24-propyl; 3,24-diisopropyl; 3-isopropyl, 24-n-butyl; 3-isopropyl, 24-sec.-butyl; 3-isopropyl, 24-cyclopentyl; 3-isopropyl, 24-cyclohexyl; 3-n-butyl, 24-methyl; 3-n-butyl, 24-ethyl; 3-n-butyl, 24-propyl; 3-n-butyl, 24-isopropyl; 3,24-di-n-butyl; 3-n-butyl, 24-sec.-butyl; 3-n-butyl, 24-cyclopentyl; 3-n-butyl, 24-cychohexyl; 3-sec.-butyl, 24-methyl; 3-sec.-butyl, 24-ethyl; 3-sec.-butyl, 24-propyl; 3-sec.-butyl, 24-isopropyl; 3-sec.-butyl, 24-n-butyl; 3,24-di-sec.-butyl; 3-sec.-butyl, 24-cyclopentyl; 3-sec.-butyl, 24-cyclohexyl; 3-cyclopentyl, 24-methyl; 3-cyclopentyl, 24-ethyl; 3-cyclopentyl, 24-propyl; 3-cyclopentyl, 24-isopropyl; 3-cyclopentyl; 24-n-butyl; 3-cyclopentyl, 24-sec.-butyl; 3,24-di-cyclopentyl; 3-cyclopentyl, 24-cyclohexyl; 3-cyclohexyl, 24-methyl; 3-cyclohexyl, 24-ethyl; 3-cyclohexyl, 24-propyl; 3-cyclohexyl, 24-isopropyl; 3-cyclohexyl, 24-n-butyl; 3-cyclohexyl, 24-sec.-butyl; 3-cyclohexyl, 24-cyclopentyl and 3,24-dicyclohexyl.

In a similar manner mixtures of isomers A and B of the 24-methyl, 24-propyl, 24-ethyl, 24-isopropyl, 24-n-butyl, 24-sec.-butyl, 24-cyclopentyl and 24-cyclohexyl ethers of 3,24 - dihydroxy - 17β,24-dihydroxy-19,21-dinochola - 1,3,5(10),22 - tetraen-20-one, 3,24-dihydroxy-17β,24-dihydroxy - 19,21 - dinorchola - 1,3,5,6,8(9),22-hexaen-20-one and 7α,8-17β,24-diepoxy-3,24-dihydroxy-19,21-dinorchola-1,3,5(10),22-tetraen-20-one, obtained in Example 27, are hydrogenated to yield mixtures of isomers A and B of the 24-methyl, 24-ethyl, 24-propyl, 24-isopropyl, 24-n-butyl, 24-sec.-butyl, 24-cyclopentyl, 24-cyclohexyl ethers of 3,24-dihydroxy-17β,24-epoxy-19,21-dinorchola-1,3,5(10)-trien - 20 - one, 3,24 - dihydroxy - 17β,24-epoxy-19,21 - dinorchola-1,3,5,6,8(9)-pentaen-20-one and 7α,8-17β,24-diepoxy-3,24-dihydroxy-19,21-dinorchola-1,3,5(10)-trien-20-one.

Similarly, hydrogenation of the mixtures of isomers A and B of the 3-tetrahydropyranyl, 24-methyl; 3-tetrahydropyranyl, 24-ethyl; 3-tetrahydropyranyl, 24-propyl; 3-tetrahydropyranyl, 24-isopropyl; 3-tetrahydropyranyl, 24-n-butyl; 3-tetrahydropyranyl, 24-sec.-butyl; 3-tetrahydropyranyl, 24-propyl; 3-tetrahydropyranyl, 24-isopropyl; 3-tetrahydropyranyl, 24 - n-butyl; 3 - tetrahydropropyranyl, 24-sec.-butyl; 3-terahydropyranyl, 24-cyclopentyl; 3-tetrahydropyranyl, 24-cyclo-hexyl diethers of 3,24-dihydroxy-17β,24-epoxy-19,21-dinorchola - 1,3,5(10),22-tetraen-20-one, 3,24-dihydroxy-17β,24-epoxy-19,21-dinorchola-1,3,5 6,8(9),22-hexaen-20-one and 7α,8-17β,24-diepoxy-3,24-dihydroxy - 19,21-dinorchola-1,3,5(10),22-tetraen-20-one, described in Example 29, affords the 3-tetrahydropyranyl, 24-methyl; 3-tetrahydropyranyl, 24-ethyl; 3-tetrahydropyranyl, 24 propyl; 3-tetrahydropyranyl, 24-isopropyl; 3-tetrahydropyranyl, 24-n-butyl; 3-tetrahydropyranyl, 24-sec. - butyl; 3 - tetrahydropyranyl, 24 - cyclopentayl and 3-tetrahydropyranyl, 24-cyclohexyl diethers of 3,24-dihydroxy-17β,24-epoxy-19,21 - dinorchola-1,3,5(10)-trien-20-one, 3,24 - dihydroxy - 17β,24-epoxy-19,21-dinorchola-1,3,5,6,8(9) - pentaen-20-one and 7α,8-17β,24-diepoxy-3,24-dihydroxy-19,21-dinochola-1,3,5(10)-trien-20-one, as mixtures of isomers A and B.

By a similar procedure the mixtures of isomers A and B of the 3-acetates, 3-propanoates, 3-butanoates, 3-pentanoates, 3-hexanoates and 3-heptanoates of the 24-methyl, 24-ethyl, 24-propyl, 24-isopropyl, 24-butyl, 24-sec.-butyl, 24-cyclopentyl, 24-cyclohexyl ethers of 3,24-dihydroxy-17β,24-epoxy-19,21 - dinorchola-1,3,5(10),22-tetraen-20-one, 3,24 - dihydroxy - 17β,24-epoxy-19,21-dinorchola-1,3,5,6,8(9),22-hexaen-20-one and 7α,8-17β,24-diepoxy-3,24-dihydroxy-19,21 - dinorchola - 1,3,5(10),22-tetraen-20-one, obtained in Example 28, are hydrogenated to give the 3-acetates, 3-propanoates, 3-butanoates, 3-pentanoates, 3-hexanoates and 3-heptanoates of the 24-methyl, 24-ethyl, 24-propyl, 24-isopropyl, 24-n-butyl, 24-sec.-butyl, 24-cyclopentyl, 24-cyclohexyl ethers of 3,24-dihydroxy-17β,24 - epoxy-19,21-dinorchola-1,3,5(10)-trien-20 - one, 3,24 - dihydroxy - 17β,24 - epoxy-19,21-dinorchola-1,3,5 6,8(9)-pentaen-20-one and 7α,8-17β,24-diepoxy-3,24-dihydroxy-19,21-dinorchola-1,3,5(10)-trien-20-one, as mixtures of isomers A and B.

EXAMPLE 39

A mixture of 3,17β-dihydroxy-20-oxo-19,21-dinorchola-1,3,5(10),22-tetraenoic acid δ-lactone (15.4 g.), obtained in Example 30, methylene chloride (620 ml.), glacial acetic acid (770 ml.) and zinc dust (77 g.) is stirred for 2 hours at room temperature. The metal is filtered and washed with methylene chloride. The filtrate is evaporated under reduced pressure to a small volume and water is added. The resulting solid is filtered, washed with water and dried. This solid is crystallized from acetone yielding 3,17β-dihydroxy -20- oxo-19,21-dinorchola-1,3,5(10)-trienoic acid δ-lactone M.P. 288–290°.

Similarly reduction of 3,17β-dihydroxy-20-oxo-19,21-dinorchola-1,3,5,6,8(9),22-hexaenoic acid δ-lactone and 3,17β - dihydroxy - 7α,8-epoxy-20-oxo-19,21-dinorchola-1,3,5(10),22-tetraenoic acid δ-lactone, affords 3,17β-dihydroxy-20-oxo-19,21-dinorchola - 1,3,5,6,8(9) - pentanoic acid δ-lactone and 3,17β-dihydroxy-7α,8-epoxy-20-oxo-19,21-dinorchola-1,3,5(10)-trienoic δ-lactone, respectively.

EXAMPLE 40

A mixture of the 3-methyl ether of 3,17β-dihydroxy-20 - oxo - 19,21-dinorchola-1,3,5(10),22-tetraenoic acid δ-lactone (350 mg.), obtained in Example 31, chloroform (10.5 ml.), glacial acetic acid (35 ml.) and zinc dust (1.75 g.), is stirred at room temperature for 30 minutes. The metal is filtered. The filtrate is diluted with chloroform. The chloroform solution is washed with water and sodium bicarbonate and again water to neutrality. After drying and evaporating the solution, the residue is crystallized from methylene chloride-methanol yielding the 3-methyl ether of 3,17β-dihydroxy-20-oxo-19,21-dinorchola-1,3,5(10)-trienoic acid δ-lactone M.P. 165–167°.

In a similar manner the 3-ethyl, 3-propyl, 3-isopropyl, 3-n-butyl, 3-sec.-butyl, 3-cyclopentyl, 3-cyclohexyl ethers of 3,17β-dihydroxy-20-oxo-19,21-dinorchola-1,3,5,(10),-22-tetraenoic acid δ-lactone, obtained in Examples 31 and 32, are reduced to yield the 3-ethyl, 3-propyl, 3-isopropyl, 3-n-butyl, 3-sec.-butyl, 3-cyclopentyl, 3-cyclohexyl ethers of 3,17β-dihydroxy-20-oxo-19,21-dinorchola-1,3,5(10)-trienoic acid δ-lactone.

Similarly the 3-methyl, 3-propyl, 3-ethyl, 3-isopropyl, 3-n-butyl, 3-cyclopentyl, 3-cyclohexyl ethers of 3,17β-dihydroxy-20 - 19,21 - dinorchola-1,3,5,6,8(9),22-hexaenoic acid δ-lactone are reduced to afford the 3-methyl, 3-ethyl, 3-propyl, 3-isopropyl, 3-n-butyl, 3-sec.-butyl, 3-cyclopentyl, 3 - cyclohexyl ethers of 3,17β-dihydroxy-20-oxo-19,21-dinorchola-1,3,5,6,8(9)-pentaenoic acid δ-lactone.

In a similar manner reduction of the 3-tetrahydropyranyl ethers of 3,17β - dihydroxy-20-oxo-19,21-dinorchola-1,3,5(10),22-tetraenoic acid δ-lactone, 3,17β-dihydroxy - 20 - oxo - 19,21 - dinorchola-1,3,5,6,8(9),22-hexaenoic acid δ-lactone and 3,17β-dihydroxy-7α,8-epoxy-20-oxo-19,21 - dinorchola - 1,3,5(10),22 - tetraenoic acid δ-lactone, yields the 3-tetrahydropyranyl ethers of 3,17β-dihydroxy-20-oxo-19,21-dinorchola - 1,3,5(10) - trienoic acid δ-lactone, 3,17β-dihydroxy-20-oxo-19,21-dinorchola-1,3,5,6,8(9) - pentaenoic acid δ - lactone and 3,17β-dihydroxy-7α,8-epoxy - 20 - oxo - 19,21-dinorchola-1,3,5(10)-trienoic acid δ-lactone.

EXAMPLE 41

A mixture of the 3-methyl ether of 3,17β-dihydroxy-7α,8-epoxy-20 - oxo - 19,21 - dinorchola - 1,3,5(10),22- tetraenoic acid δ-lactone (9.2 g.), described in Example 34, chloroform (275 ml.), glacial acetic acid (370 ml.) and zinc dust (46 g.) is stirred for 60 minutes at room temperature. The metal is filtered and washed with chloroform. The filtrate is evaporated to a small volume and the residue is diluted with water. The resulting solid is filtered, washed with water and dried yielding the 3-methyl ether of 3,17β-dihydroxy-7α,8-epoxy-20-oxo-19,-21-dinorchola-1,3,5(10) - trienoic acid δ-lactone M.P. 214–217°.

Similarly the 3-ethyl, 3-propyl, 3-isopropyl, 3-n-butyl, 3-sec.-butyl, 3 - cyclopentyl, 3 - cyclohexyl ethers of 3,17β - dihydroxy - 7α,8-epoxy-20-oxo-19,21-dinorchola-1,3,5(10),22 - tetraenoic acid δ-lactone are reduced to yield the 3-ethyl, 3-propyl, 3-isopropyl, 3-n-butyl, 3-sec.-butyl, 3-cyclopentyl, 3-cyclohexyl ethers of 3,17β - dihydroxy-7α,8 - epoxy - 20 - oxo - 19,21-dinorchola-1,3,5(10)-trienoic acid δ-lactone.

EXAMPLE 42

A solution of 3,17β - dihydroxy-20-oxo-19,21-dinorchola-1,3,5(10)-trienoic acid δ-lactone (7.6 g.), prepared in Example 39, pyridine (76 ml.) and acetic anhydride (76 ml.) is stirred for two hours at room temperature. The solution is poured in ice-water and the resulting solid is filtered, washed with water and dried. Crystallization of this solid with acetone and then methylene chloride-methanol affords the 3-acetate of 3,17β-dihydroxy-20-oxo-19,21 - dinorchola-1,3,5(10)-trienoic acid δ-lactone M.P. 212–214°.

In a similar manner acylation with other acylating agents of 3,17β - dihydroxy - 20-oxo-19,21-dinorchola-1,3,5(10)-trienoic acid δ-lactone affords the 3-propanoate, 3-butanoate, 3-pentanoate, 3-hexanoate and 3-heptanoate of 3,17β - dihydroxy - 20-oxo-19,21-dinorchloa-1,3,5(10)-trienoic acid δ-lactone.

Similarly acylation of 3,17β-dihydroxy-20-oxo-19,21-dinorchola - 1,3,5,6,8(9)-pentaenoic acid δ-lactone and 3,17β-dihydroxy-7α,8 - epoxy - 20 - oxo - 19,21-dinorchola-1,3,5(10)-trienoic acid δ-lactone yields the corresponding 3-acylates such as the 3-acetates, 3-propanoates, 3-butanoates, 3-hexanoates, 3-pentanoates and 3-heptanoates of 3,17β - dihydroxy - 20 - oxo-19,21-dinorchola-1,3,5,6,8(9) - pentaenoic acid δ-lactone and 3,17β-dihydroxy-7α,8-epoxy - 20 - oxo - 19,21-dinorchola-1,3,5(10)-trienoic acid δ-lactone.

EXAMPLE 43

A mixture of the 3-acetate of 3,17β-dihydroxy-20-oxo-19,21-dinorchola-1,3,5(10),22 - tetraenoic acid δ-lactone (1 g.), described in Example 33, glacial acetic acid (50 ml.) and zinc dust (5 g.) is stirred for one hour at room temperature. The metal is filtered and the filtrate is diluted with water. The resulting solid is filtered, washed with water and dried to yield the 3-acetate of 3,17β-dihydroxy-20-oxo-19,21-dinorchola-1,3,5(10)-trienoic acid δ-lactone identical with the product obtained in Example 42.

In a similar manner the 3-propanoate, 3-butanoate, 3-pentanoate, 3-hexanoate, 3-heptanoate of 3,17β-dihydroxy-20-oxo-19,21-dinorchola-1,3,5(10),22 - tetraenoic acid δ-lactone, described in Example 33, are reduced to yield the 3-propanoate, 3 - butanoate, 3-pentanoate, 3-hexanoate and 3-heptanoate of 3,17β-dihydroxy-20-oxo-19,21-dinorchola-1,3,5(10)-trienoic acid δ-lactone.

Similarly reduction of the 3-acetates, 3-propanoates, 3-butanoates, 3-pentanoates, 3-hexanoates and 3-heptanoates of 3,17β - dihydroxy - 20 - oxo-19,21-dinorchola-1,3,5,6,8(9),22-hexaenoic acid δ-lactone and 3,17β-dihydroxy - 7α,8 - epoxy-20-oxy-19,21-dinorchola-1,3,5(10),-22-tetraenoic acid δ-lactone, obtained in Example 33, affords the 3-acetates, 3-propanoates, 3-butanoates, 3-pentanoates, 3-hexanoates and 3-heptanoates of 3,17β-di-hydroxy - 20 - oxo - 19,21 - dinorchola - 1,3,5,6,8(9)-pentaenoic acid δ-lactone and 3,17β - dihydroxy-7α,8-epoxy-20-oxo-19,21-dinorchola-1,3,5(10) - trienoic acid δ-lactone.

EXAMPLE 44

By the method described in Example 30, the mixtures of isomers A and B of 3,24-dihydroxy-17β,24-epoxy-19, 21 - dinorchola1,3,5(10) - trien - 20 - one, 3,24 - dihydroxy - 17β,24 - epoxy - 19,21 - dinorchola - 1,3,5,6,8, (9)-pentaen-20-one and 7α,8-17β,24-diepoxy-3,24-dihydroxy - 19,21 - dinorchola - 1,3,5(10) - trien - 20 - one, obtained in Example 36, are oxidized with chromic acid in acetone solutions to yield 3,17β-dihydroxy-20-oxo-19,21-dinorchola-1,3,5(10)-trienoic acid δ-lactone, 3,17β-dihydroxy - 20 - oxo - 19,21 - dinorchola - 1,3,5,6,8,(9) - pentaenoic acid δ-lactone and 3,17-dihydroxy-7α,8-epoxy-20-oxo-19,21-dinorchola-1,3,5(10)-trienoic acid δ-lactone.

Similarly oxidation of mixtures of isomers A and B of the 3-acetates, 3-propanoates, 3-butanoates, 3-pentanoates, 3-hexanoates and 3-heptanoates of 3,24-dihydroxy-17β,24-epoxy-19,21-dinorchola-1,3,5(10)-trien-20-one, 3,24-dihydroxy - 17β,24 - epoxy - 19,21 - dinorchola - 1,3,5,6,8 (9)-pentaen-20-one and 7α,8-17β,24-diepoxy-3,24-dihydroxy - 19,21 - dinorchola - 1,3,5(10)-trien-20-one, obtained in Example 36, yields the 3-acetates, 3-propanoates, 3-butanoates, 3-pentanoates, 3-hexanoates and 3-heptanoates of 3,17β-dihydroxy-20-oxo-19,21-dinorchola-1,3,5(10)-trienoic acid δ-lactone, 3,17β-dihydroxy-20-oxo-19,21-dinorchola-1,3,5,6,8(9)-pentaenoic acid δ-lactone and 3,17β-dihydroxy-7α,8-epoxy-20-oxo-19,21-dinorchola-1,3,5(10)-trienoic acid δ-lactone.

In a similar manner this mixtures of isomers A and B of the 3-methyl, 3-ethyl, 3-propyl, 3-isopropyl, 3-n-butyl, 3-sec.-butyl, 3-cyclopentyl and 3-cyclohexyl ethers of 3,24-dihydroxy - 17β,24 - epoxy - 19,21 - dinorchola - 1,3,5 (10) - trien - 20 - one, 3,24 - dihydroxy - 17β,24 - epoxy-19,21 - dinorchola - 1,3,5,6,8(9) - pentaen - 20 - one and 7α,8 - 17β,24 - epoxy - 3,24 - dihydroxy - 19,21 - dinorchlora-1,3,5(10)-trien-20-one, obtained in Example 36, are oxidized to afford the 3-methyl, 3-ethyl, 3-propyl, 3-isopropyl, 3-n-butyl, 3-sec.-butyl, 3-cyclopentyl and 3-cyclohexyl ethers of 3,17β-dihydroxy - 20 - oxo - 19,21-dinorchola - 1,3,5(10) - trienoic acid δ - lactone, 3,17β-dihydroxy - 20 - oxo - 19,21 - dinorchola - 1,3,5,6,8(9)-pentaenoic acid δ-lactone and 3,17β-dihydroxy - 7α,8-epoxy-20-oxo - 19,21 - dinorchola-1,3,5(10)-trienoic acid δ-lactone.

I claim:
1. A compound of the formula

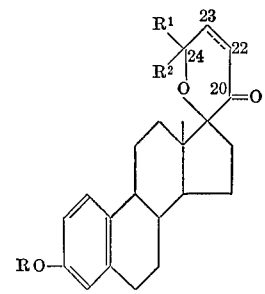

in which R is selected from the group consisting of hydrogen, alkyl groups containing from 1–4 carbon atoms, cycloalkyl groups containing from 5–6 carbon atoms, the tetrahydropyranyl group, and acyl groups containing from 2–7 carbon atoms; $R^1$ and $R^2$ together represent ketonic oxygen; and $R^1$ is hydrogen and $R^2$ is selected from the group consisting of hydroxyl, aliphatic acyloxy groups containing from 2–7 carbon atoms, alkoxy groups containing from 1–4 carbon atoms, and cycloalkoxy groups containing from 5–6 carbon atoms.

2. A compound of the formula

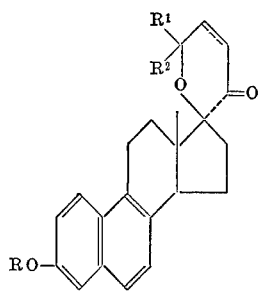

in which R is selected from the group consisting of hydrogen, alkyl groups containing from 1–4 carbon atoms, cycloalkyl groups containing from 5–6 carbon atoms, the tetrahydropyranyl group, and acyl groups containing from 2–7 carbon atoms; $R^1$ and $R^2$ together represent ketonic oxygen; and $R^1$ is hydrogen and $R^2$ is selected from the group consisting of hydroxyl, aliphatic alkoxy groups containing from 2–7 carbon atoms, alkoxy groups containing from 1–4 carbon atoms, and cycloalkoxy groups containing from 5–6 carbon atoms.

3. A compound of the formula

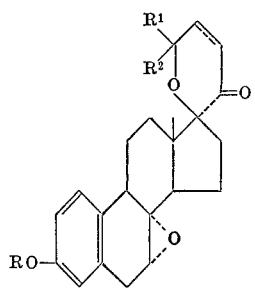

in which R is selected from the group consisting of hydrogen, alkyl groups containing from 1–4 carbon atoms, cycloalkyl groups containing from 5–6 carbon atoms, the tetrahydropyranyl group, and acyl groups containing from 2–7 carbon atoms; $R^1$ and $R^2$ together represent ketonic oxygen; and $R^1$ is hydrogen and $R^2$ is selected from the group consisting of hydroxyl, aliphatic acyloxy groups containing from 2–7 carbon atoms, alkoxy groups containing from 1–4 carbon atoms, and cycloalkoxy groups containing from 5–6 carbon atoms.

4. A compound as described in claim 1 which is: 3,24-dihydroxy - 17β,24 - epoxy - 19,21 - dinorchola - 1,3,5(10),22-tetraen-20-one.

5. A compound as described in claim 1 which is: the 3-methyl ether of 3,24-dihydroxy-17β,24-epoxy-19,21-dinorchola-1,3,5(10),22-tetraen-20-one.

6. A compound as described in claim 1 which is: the 24-acetate of the 3-methyl ether of 3,24-dihydroxy-17β,24-epoxy-19,21-dinorchola-1,3,5(10),22-tetraen-20-one.

7. A compound as described in claim 1 which is: the 3,24-dimethyl ether of 3,24-dihydroxy-17β,24-epoxy-19,21-dinorchola-1,3,5(10),22-tetraen-20-one.

8. A compound as described in claim 1 which is: the 3-cyclopentyl ether of 3,24-dihydroxy-17β,24-epoxy-19,21-dinorchola-1,3,5(10),22-tetraen-20-one.

9. A compound as described in claim 1 which is: the 24-acetate of the 3-cyclopentyl ether of 3,24-dihydroxy-17β,24 - epoxy - 19,21 - dinorchola - 1,3,5(10),22 - tetraen-20-one.

10. A compound as described in claim 1 which is: the 3,24-diacetate of 3,24-dihydroxy-17β,24-epoxy-19,21-dinorchola-1,3,5(10),22-tetraen-20-one.

11. A compound as described in claim 1 which is: the 3-methyl ether of 3,17β-dihydroxy-20-oxo-19,21-dinorchola-1,3,5(10),22-tetraenoic acid δ-lactone.

12. A compound as described in claim 1 which is: the 3-acetate of 3,17β-dihydroxy-20-oxo-19,21-dinorchola-1,3,5(10),22-tetraenoic acid δ-lactone.

13. A compound as described in claim 1 which is: the 3-cyclopentyl ether of 3,17β-dihydroxy-20-oxo-19,21-dinorchola-1,3,5(10),22-tetraenoic acid δ-lactone.

14. A compound as described in claim 1 which is: the 3-methyl ether of 3,17β-dihydroxy-20-oxo-19,21-dinorchola-1,3,5(10)-trienoic acid δ-lactone.

15. A compound as described in claim 1 which is: the 3-acetate of 3,17β-dihydroxy-20-oxo-19,21-dinorchola-1,3,5(10)-trienoic acid δ-lactone.

16. A compound as described in claim 3 which is: the 3-methyl ether of 7α,8-17β,24-diepoxy-3,24-dihydroxy-19,21-dinorchola-1,3,5(10),22-tetraen-20-one.

17. A compound as described in claim 3 which is: the 24-acetate of the 3-methyl ether of 7α,8-17β,24-diepoxy-3,24-dihydroxy-19,21 - dinorchola - 1,3,5(10),22-tetraen-20-one.

18. A compound as described in claim 3, which is the methyl ether of 3,17β-dihydroxy-7α,8-epoxy-20-oxo-19,21-dinorchola-1,3,5(10),22-tetraenoic acid δ-lactone.

19. A compound of the formula

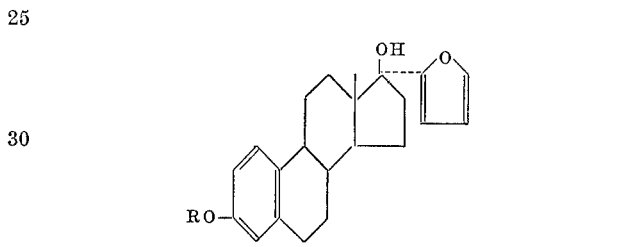

in which R represents hydrogen, a lower aliphatic alkyl group from one to four carbon atoms, a cycloalkyl group of five to six carbon atoms, a tetrahypropyranyl group and an acyl group of two to seven carbon atoms.

20. A compound of the formula

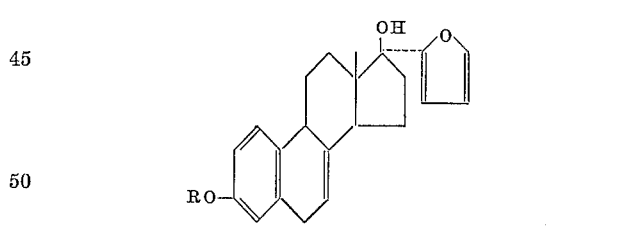

in which R represents hydrogen, a lower aliphatic alkyl group of one to four carbon atoms, a cycloalkyl group of five to six carbon atoms, a tetrahydropyranyl group and an acyl group of two to seven carbon atoms.

21. A compound of formula

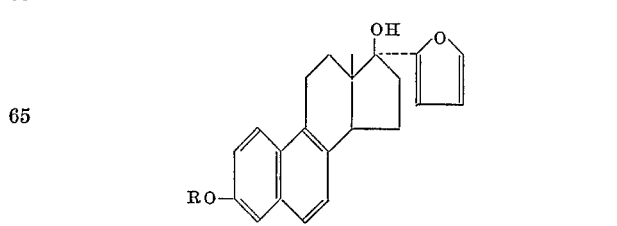

in which R represents hydrogen, a lower aliphatic alkyl group of one to four carbon atoms, a cycloalkyl group of five to six carbon atoms, a tetrahydropyranyl group and an acyl group of two to seven carbon atoms.

22. A process for preparing compounds of the formulae

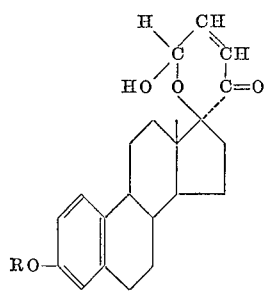 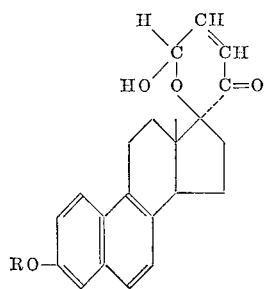

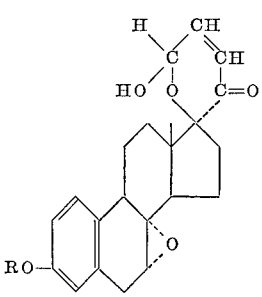

in which R is selected from the group consisting of hydrogen, alkyl groups containing from 1–4 carbon atoms, cycloalkyl groups containing from 5–6 carbon atoms, the tetrahydropyranyl group, and acyl groups containing from 2–7 carbon atoms, which comprises treating the corresponding 17α[2′-furyl]17β-hydroxy steroid with an acid selected from the group consisting of organic peracids and hypohalous acids, and isolating the reaction product.

23. A process for preparing compounds of the formula

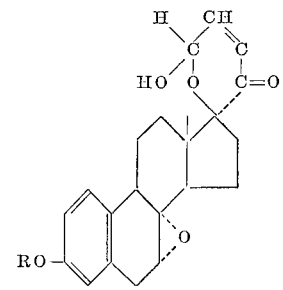

in which R is selected from the group consisting of hydrogen, alkyl groups containing from 1–4 carbon atoms, cycloalkyl groups containing from 5–6 carbon atoms, the tetrahydropyranyl group, and acyl groups containing from 2–7 carbon atoms which comprises treating a compound of the formula

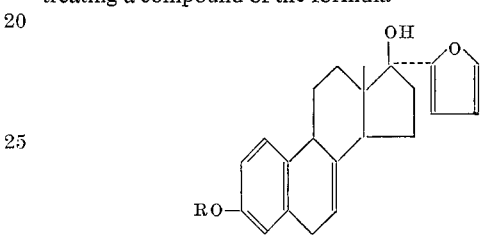

in which R has the same significance as defined above, with an organic peracid, and isolating the reaction product.

References Cited

UNITED STATES PATENTS 3,432,486   3/1969   Minato.

HENRY A. FRENCH, Primary Examiner

U.S. Cl. X.R.

260—239.57, 999

PO-1050
(5/69)

UNITED STATES PATENT OFFICE
CERTIFICATE OF CORRECTION

Patent No. 3,547,912            Dated December 15, 1970

Inventor(s) Yvon Lefebvre

It is certified that error appears in the above-identified patent and that said Letters Patent are hereby corrected as shown below:

Column 4, line 25, the right hand formula is incorrect and should read:

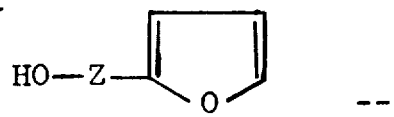

Column 4, line 46, the word "esterone" should read -- estrone --.

Signed and sealed this 13th day of April 1971.

(SEAL)
Attest:

EDWARD M. FLETCHER, JR.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,547,912          Dated December 15, 1970

Inventor(s) Yvon Lefebvre

It is certified that error appears in the above-identified patent and that said Letters Patent are hereby corrected as shown below:

Claim 2, Column 29, line 22 the words "aliphatic alkoxy groups" should read -- aliphatic acyloxy groups --.

Signed and sealed this 11th day of April 1972.

(SEAL)
Attest:

EDWARD M.FLETCHER,JR.
Attesting Officer

ROBERT GOTTSCHALK
Commissioner of Pate